(12) United States Patent
Win et al.

(10) Patent No.: US 6,182,142 B1
(45) Date of Patent: Jan. 30, 2001

(54) DISTRIBUTED ACCESS MANAGEMENT OF INFORMATION RESOURCES

(75) Inventors: Teresa Win, Sunnyvale; Emilio Belmonte, San Francisco, both of CA (US)

(73) Assignee: enCommerce, Inc., Santa Clara, CA (US)

( * ) Notice: Under 35 U.S.C. 154(b), the term of this patent shall be extended for 0 days.

(21) Appl. No.: 09/113,609

(22) Filed: Jul. 10, 1998

(51) Int. Cl.[7] .................................................... G06F 13/00
(52) U.S. Cl. ......................... 709/229; 709/219; 709/227; 713/201
(58) Field of Search .................................... 709/202, 203, 709/217, 219, 223, 225, 229, 313, 227; 713/200, 201, 202

(56) References Cited

U.S. PATENT DOCUMENTS

| | | | |
|---|---|---|---|
| 5,261,102 | * | 11/1993 | Hoffman . |
| 5,845,267 | * | 12/1998 | Ronen ................................... 705/40 |
| 5,918,013 | * | 6/1999 | Mighdoll et al. .................... 709/217 |
| 5,944,824 | * | 8/1999 | He ....................................... 713/201 |
| 6,014,666 | * | 1/2000 | Helland et al. .......................... 707/9 |

\* cited by examiner

*Primary Examiner*—Viet D. Vu
(74) *Attorney, Agent, or Firm*—Hickman Palermo Truong & Becker, LLP; Christopher J. Palermo; Marcel K. Bingham

(57) ABSTRACT

Using a method for controlling access to information resources, a single secure sign-on gives the user access to authorized resources, based on the user's role in the organization. The information resources are stored on a protected server. A user of a client or browser logs in to the system. A runtime module on the protected server receives the login request and intercepts all other request by the client to use a resource. The runtime module connects to an access server that can determine whether a particular user is authentic and which resources the user is authorized to access. User information is associated with roles and functional groups of an organization to which the user belongs; the roles are associated with access privileges. The access server connects to a registry server that stores information about users, roles, functional groups, resources, and associations among them. The access server and registry server exchange encrypted information that authorized the user to use the resource. The access server passes encrypted tokens that define the user's roles and authorization rights to the browser or client, which stores the tokens in memory. The user is presented with a customized display showing only those resources that the user may access. Thereafter, the access server can resolve requests to use other resources based on the tokens without contacting the registry server.

34 Claims, 18 Drawing Sheets

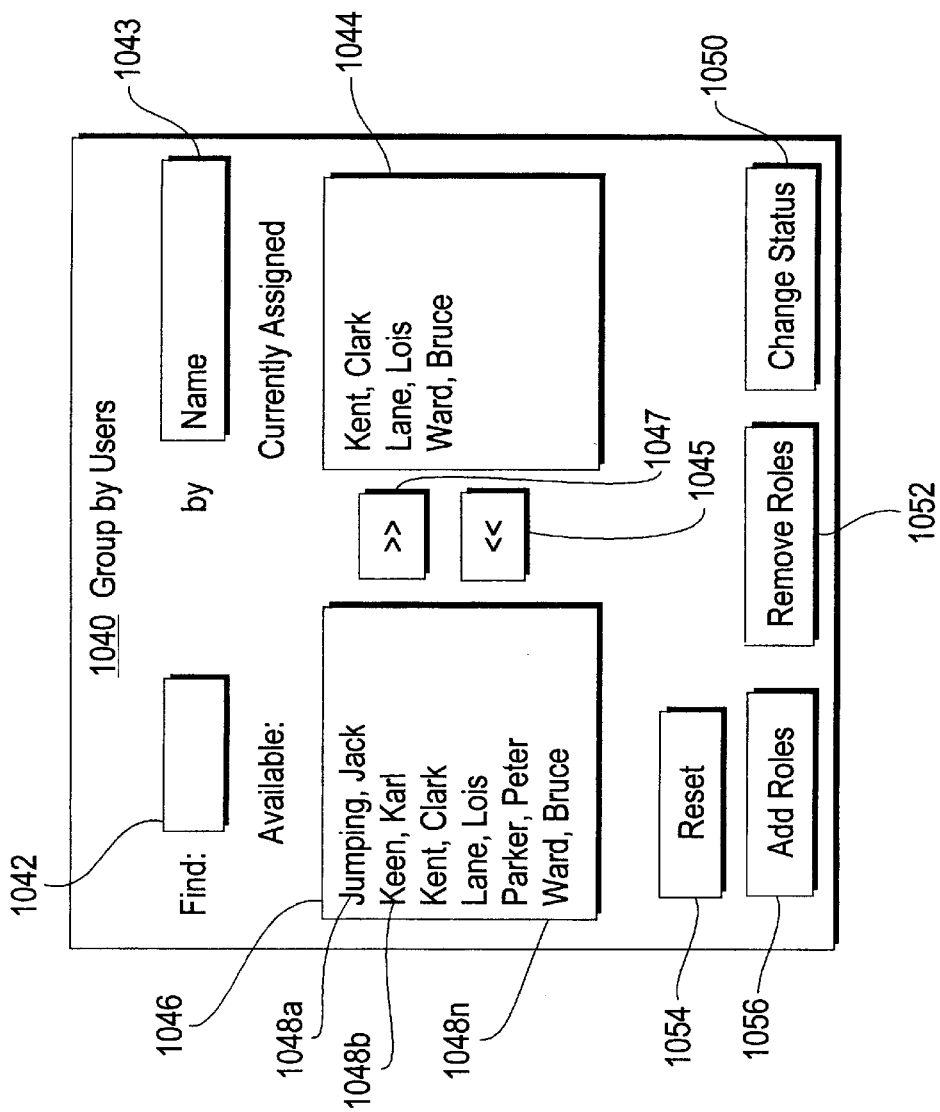

DISTRIBUTED ACCESS MANAGEMENT OF INFORMATION RESOURCES

FIELD OF THE INVENTION

This invention generally relates to methods of controlling access to protected information resources in a network environment. The invention relates more specifically to methods, apparatus, and products for facilitating secure and selective access to network resources based on a role of a user of the resources.

BACKGROUND OF THE INVENTION

Computer networks have become ubiquitous in business, industry, and education. In one approach, a network is configured with one or more user accounts, each of which is uniquely associated with a human network user or host computer. The network also has one or more resources, such as application programs that provide various computing functions, which are available to all users. In this approach, a user logs into his or her user account, selects a desired application. A disadvantage of this approach is that every user has the same rights to access any of the network resources.

Development of the globally accessible, packet-switched network known as the Internet has enabled network resources, accounts and applications to become available worldwide. Development of hypertext protocols that implement the World Wide Web ("The Web") is enabling networks to serve as a platform for global electronic commerce. In particular, the Web is enabling the easy exchange of information between businesses and their customers, suppliers and partners.

Businesses are rushing to publish information on the Web and just as quickly stumbling into several roadblocks. For example, some information is valuable and sensitive, and needs to be made available only to selected users. Thus, there is a need to provide selective access to network resources and information over the Web.

This need exists in the context of internal Web networks that are available to employees of an organization, called Intranets, as well as Web networks and resources that are available to external customers, suppliers and partners of the organization, called extranets. Extranet users may require information from a large number of diverse sources, for example, product catalogs, customer databases, or inventory systems. There may be millions of potential users, the number of which grows dramatically as an organization prospers. Thus, there is a need for a large-scale system that can provide selective access to a large number of information sources for a large number of users.

Because some of the information sources are sensitive, there is a need to provide secure access to the information.

Current networks and Web systems, including Intranets and extranets, are expensive and complex to implement. These technologies also change rapidly. There is a need for any information access method or system to integrate with and use existing equipment, software and systems. There is also a need for method and system that is flexible or adaptable to changing technologies and standards.

One approach to some of the foregoing problems and needs has been to provide each network resource or application program with a separate access control list. The access control list identifies users or hosts that are authorized to access a particular application. As new users or hosts are added to the network, the access control lists grow, making security management more complicated and difficult. Use of a large number of separate lists also makes the user experience tedious and unsatisfactory.

Another disadvantage of the foregoing approaches is duplication of management processes. To add new users to the system, a network administrator must repeat similar access processes for each application or resource to be made available to the new users. The redundancy of these processes, combined with rapid growth in the number of users, can make the cost of deploying, managing and supporting a system unacceptably high.

Thus, there is a need for a mechanism to govern access to one or more information resources in which selective access is given to particular users.

There is also a need for such a mechanism that is equally adaptable to an internal network environment and to an external network environment.

There is a further need for such a mechanism that is easy to configure and re-search configure as new users and resources become part of the system.

There is still another need for such a mechanism that is simple to administer.

SUMMARY OF THE INVENTION

The foregoing needs, and other needs and objectives that will become apparent from the description herein, are achieved by the present invention, which comprises, in one aspect, a method of controlling access to one or more information resources stored on a first server, the method comprising the steps of receiving information describing a user at the first server; identifying, at a second server coupled to the first server, a subset of the resources that the user is authorized to access, based on one or more roles that are stored in association with user identifying information; communicating information defining the subset to the first server; storing first information defining the subset, and second information defining the roles, in one or more tokens; communicating the tokens to a client that is associated with the user; and thereafter resolving requests to use the resources at the first server based on the tokens.

One feature of this aspect is the steps of defining a role of the user; and storing an association of the user to the role at the second server. A related feature is the steps of defining one or more roles and functional groups of an organization to which the user belongs; storing information describing the roles and functional groups in association with information describing the user; and determining whether the user may access the resource based on the information describing the roles and functional groups.

According to another feature, the identifying step further comprises the steps of connecting the first server to the second server, in which the second server stores information describing the user, one or more roles, one or more functional groups, the resources, and associations among them; and communicating a request for a profile of the user from the first server to the second server. In another feature, the receiving step further comprises the steps of receiving the information describing the user at a runtime module on the first server that also intercepts requests to access the resource. In yet another feature, the step of identifying further comprises the step of determining whether the user is authentic. A related feature is that the step of identifying further comprises the steps of communicating encrypted information between the first server and the second server describing resources that the user is authorized to use.

In another feature, the steps of communicating further comprise the steps of passing one or more encrypted tokens that define the user's roles and authorization rights from the second server to the first server. Another feature is that the steps of communicating further comprise the steps of passing one or more encrypted tokens that define the user's roles and authorization rights from the second server to the client; and storing the tokens in a memory of the client.

Another feature involves the steps of communicating, from the first server to the client, a customized display identifying only those resources that the user may access, whereby a single secure sign-on gives a user access to one or more of the resources. Still another feature involves the steps of communicating, from the first server to the client, information describing a customized display that identifies only those resources that the user may access.

In another aspect, the invention provides a method of controlling access to one or more information resources stored on a protected server, the method comprising the steps of receiving, at the protected server, login information describing a user who desires to access one of the resources; determining that the user is authentic and permitted to access one of the resources; identifying, at a second server coupled to the protected server, a subset of the resources that the user is authorized to access, based on at least one role that is stored in association with user information; communicating information defining the subset to the protected server; storing first information defining the subset, and second information defining the roles, in one or more tokens; communicating the tokens to a client that is associated with the user; and thereafter resolving requests to use the resources at the protected server based on the tokens, whereby a single secure sign-on gives the user access to the one of the resources. One feature of this aspect is the steps of receiving a request from the client to access one of the resources; determining, based on the one or more tokens, whether the client is authorized to use the one of the resources; and granting access to the one of the resources to the client. A related feature is the steps of intercepting the request from the client at a runtime module of the protected server. Yet another related feature involves the steps of granting access to the resource only when the roles associated with the user satisfy an access rule. Another feature involves the steps of defining the access rule, associated with the user, as a Boolean expression that includes one or more roles.

BRIEF DESCRIPTION OF THE DRAWINGS

The present invention is illustrated by way of example, and not by way of limitation, in the figures of the accompanying drawings and in which like reference numerals refer to similar elements and in which:

FIG. 10C is a block diagram of a user interface display generated to facilitate working with groups of users.

DETAILED DESCRIPTION OF THE PREFERRED EMBODIMENT

A method and apparatus for controlling access to protected information resources is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview of Preferred Embodiment

Figure 1:
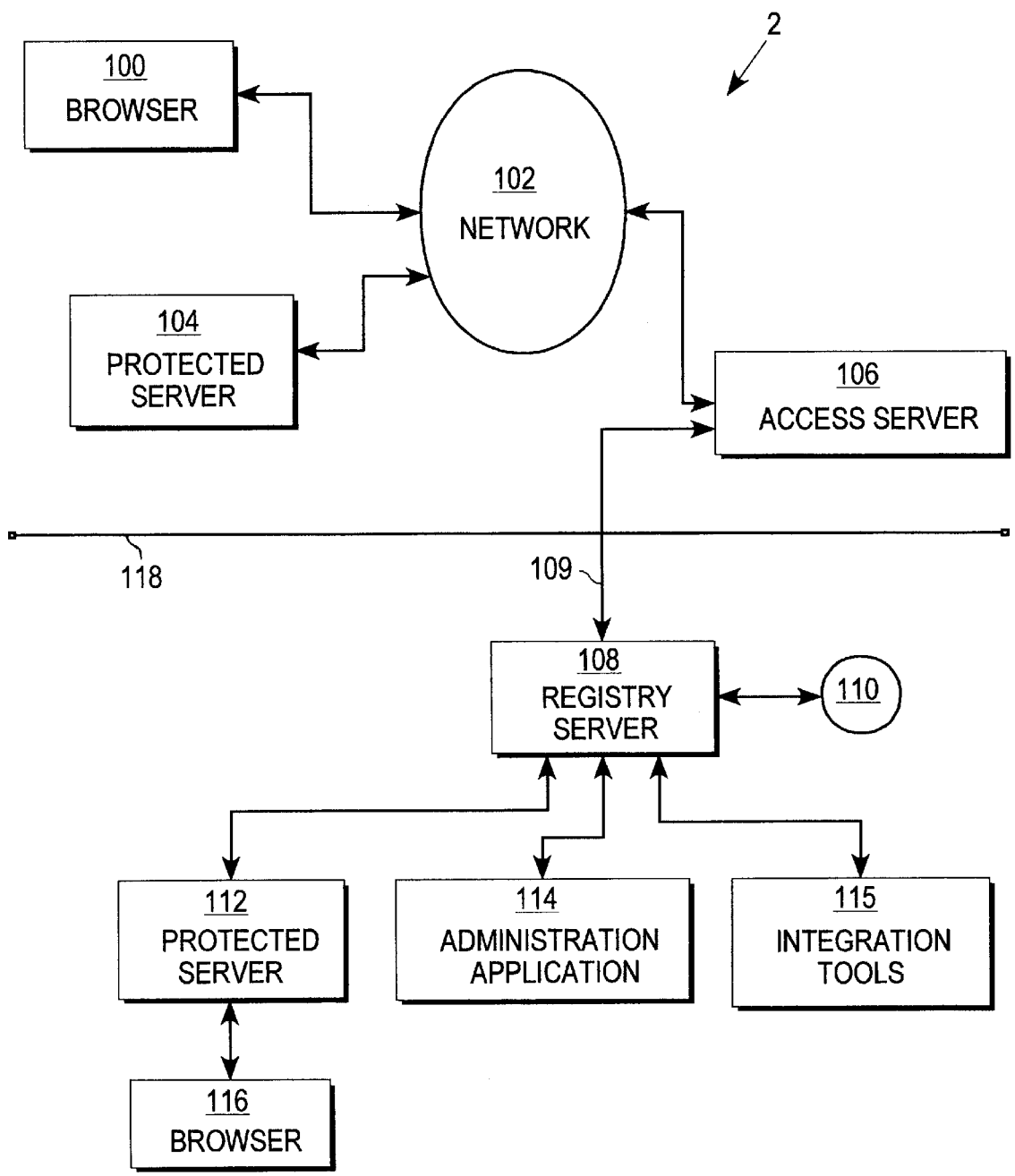
FIG. 1 is a block diagram of an information access system.
Figure 2:
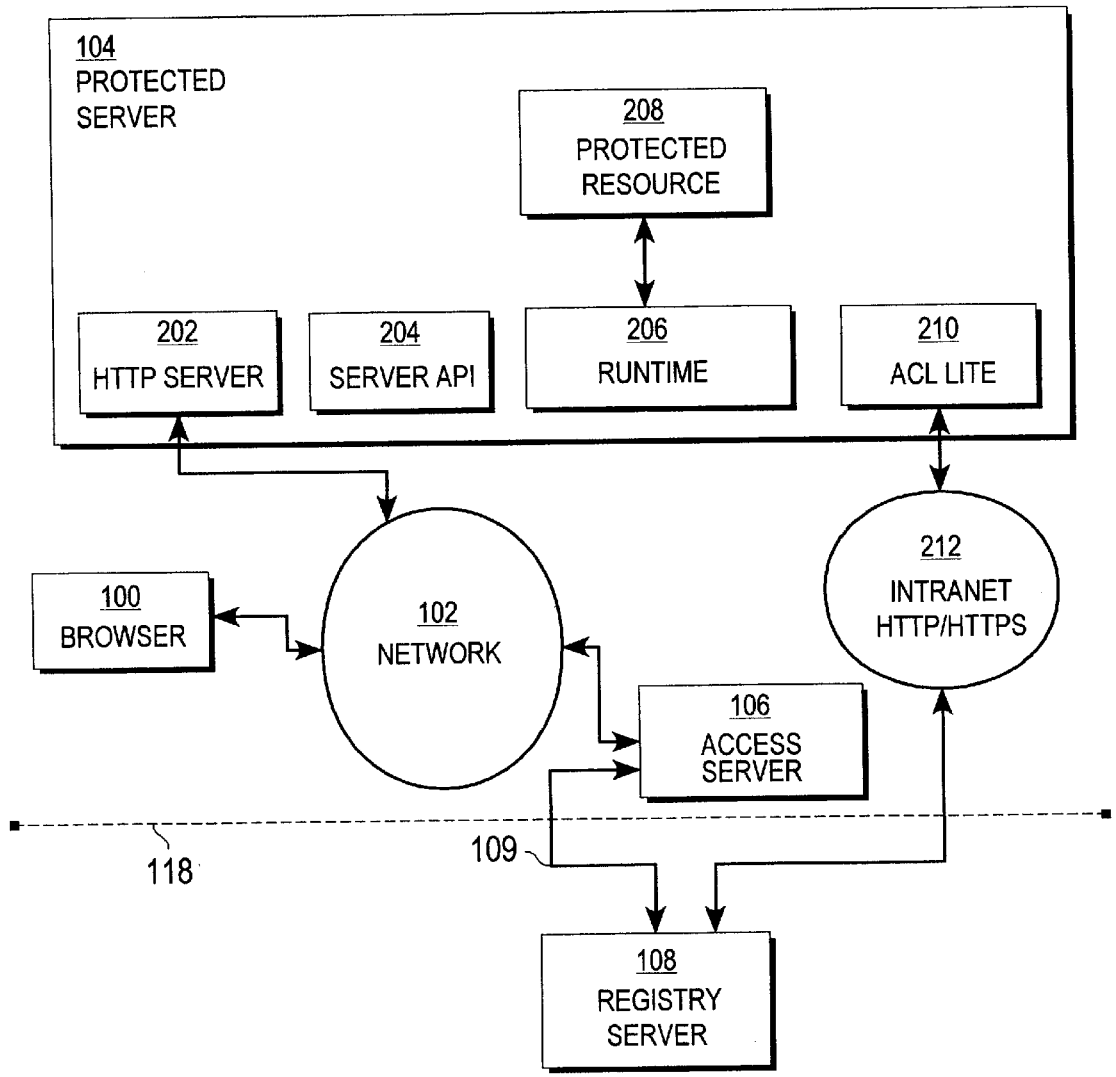
FIG. 2 is a block diagram of a protected server and its connections to the system of FIG. 1.

FIG. 1 is a block diagram of main elements of an information access system 2 according to a preferred embodiment. Generally, an information access system 2 comprises a plurality of components including an Access Server 106, Registry Server 108, Administration Application 114, and Integration Tools 115. The foregoing components cooperate to control access to resources stored on one or more Protected Servers 104, 112. Generally, each Protected Server is a Web server. Each component comprises one or more modules. Each module provides one or more services to users of the system 2 and administrators. There may be any number of Protected Servers 104. Users are individuals who have a relationship with an organization and play various roles, and are registered in the system 2. Users may be members of an organization, or may be customers, suppliers, or business partners of the organization. Administrators control the system.

In one embodiment, all the components are stored on and executed by one physical server or computer. In alternate embodiments, one ore more components are installed on separate computers; this approach may improve security and performance. For example, Registry Server 108 may be part of a secure Intranet that is protected using a firewall 118, and Access Server 106 may be located on an extranet for access by users inside and outside the enterprise. Further, there may be more than one Registry Server 108 in a mirrored or replicated configuration. Each Access Server 106 may be coupled to more than one Registry Server 108, so that a particular Access Server 106 can communicate with a second Registry Server 108 if a first one is busy or unavailable. Each Registry Server 108 may be coupled to or support more than one Access Server 106. Each Registry Server 108 may execute operations using multiple execution threads, in which access of each thread to Registry Repository 110 is managed by the Access Control Library.

A browser 100 is coupled by a communication link to a network 102. The block shown for browser 100 represents a terminal, workstation computer, or an equivalent that executes a standard Web browser program or an equivalent, such as Netscape Navigator, Internet Explorer, or NCSA Mosaic. Network 102 is a compatible information communication network, preferably the Internet. In alternate embodiments, the browser 100 is a client process or client workstation of any convenient type, and the network 102 is a data communication network that can transfer information between the client and a server that is also coupled to the network.

The system 2 enables organizations to register information sources or Resources and register Users of the information in a central repository. A Resource is a source of information, identified by a Uniform Resource Locator (URL) and published by a Web server either in a static file formatted using Hypertext Markup Language (HTML) or in a dynamically generated page created by a CGI-based program. Examples of resources include a Web page, a complete Web site, a Web-enabled database, and an applet.

The system 2 enables administrators to implement access rules by defining Roles that Users play when working for an organization or doing business with an enterprise. A Role may reflect a relationship of a User to the organization (employee, customer, distributor, supplier), their department within an organization (sales, marketing, engineering) or any other affiliation or function (member of quality task force, hotline staff member) that defines their information needs and thus their access rights or privileges. Thus, examples of Roles include Employee, Customer, Distributor, Supplier, Sales, Marketing, Engineering, and Hotline Staff.

Roles are defined by information identifying a name of a role and by a functional group in which the role resides. A functional group is often a department in which similar functions exist. Examples of functional groups are Marketing, Sales, Engineering, Human Resources, and Operations.

In some embodiments, the term User Type or Person Type refers to employees, directors, officers, contractors, customers, distributors, etc., and Role refers to a job function such as sales representative, financial analyst, etc.

Roles determine what resources a User can access. Further, each role may require a unique set of information that is available in resources. For example, a User who is an Employee in the Marketing department could access Price List and New Products Resources. Thus, system 2 enables the creation of resource profiles by assigning roles to resources, and user profiles by assigning roles to users to generate access rights. System 2 automatically links a user profile to the resources profiles that have been assigned the same roles, so that deployment of new resources may occur rapidly.

Roles and resources are owned by Functional Groups within the organization.

The system 2 makes managing access simple because it is based on an additive data model. Assigning a role to a user or deleting a role from a user can add or delete access to all resources with that role. Similarly, adding a role to a resource or removing a role from a resource can give or take away access to that resource from all users with that role. The system 2 allows administrators to make such changes in a simple manner, resulting in significant administration time savings.

The system 2 also enables Users to log-in to the system once, and thereafter access one or more Resources during an authenticated session. Users may log in either with a digital certificate or by opening a login page URL with a web browser and entering a name and password. In the past, users have had to log in individually to each Web application that they are authorized to use. In the preferred embodiment, users always access the same login page regardless of the number of resources to which they need access. Thus, the system provides a mechanism of single secure log-in to Web resources.

If the login attempt is successful, the system 2 presents the User with a Personalized Menu that assists the User in identifying and selecting a Resource. In one embodiment, a Personalized Menu is an HTML page containing a list of authorized Resources. The Personalized Menu displays only Resources to which the User has access. The User can then select and access a Resource.

Protected Server 104 is coupled to the network 102 logically separate from browser 100.

The Registry Server 108 is coupled to a Registry Repository 110 that stores information about users, resources and roles of the users. Registry Server 108 is coupled by a secure communication link 109 to Access Server 106, which is coupled to network 102. Registry Server 108 has an Authentication Server Module that manages concurrent access of multiple users or browsers 100 to Registry Repository 110.

A Protected Server 112 is coupled to Registry Server 108. The Protected Server 112 executes or supervises execution of an Administration Application 114, which functions to register and manage users, resources and roles by reading and writing information to or from Registry Repository 110.

Integration Tools 115 are selectively executed on Protected Server 112 and function to customize the particular configuration of the foregoing components. For example, Integration Tools 115 are use to customize the form or content of screen displays presented to browser 100 for user login and logout, or to enforce password selection rules. Integration Tools 115 also function to integrate resources with the foregoing components and to integrate data stores or directories with Registry Repository 110.

Access Server 106 stores a log-in page, Authentication Client Module and Access Menu Module. The Authentication Client Module authenticates a user by verifying the name and password with the Registry Server 108. If the name and password are correct, the Authentication Client Module reads the user's roles from the Registry Server 108. It then encrypts and sends this information in a "cookie" to the user's browser. A "cookie" is a packet of data sent by web servers to web browsers. Each cookie is saved by browser 100 until the cookie expires. Cookies received from a web server in a specific domain are returned to web servers in that same domain during open URL requests. A cookie returned by the Authentication Client Module is required for access to resources protected by the system 2.

Once a user has been authenticated, the Access Menu Module of the Access Server returns a Personalized Menu of the type described above.

When the user selects a resource, the browser sends an open URL request and cookie to a Protected Web Server. A Protected Web Server is a web server with resources protected by the Runtime Module. The Runtime Module decrypts information in the cookie and uses it to verify that the user is authorized to access the resource. The cookie is also used by the resource to return information that is customized based on the user's name and roles.

The Registry Server contains an Authentication Server Module and a Registry Repository. The Authentication Server Module is structured as a Java server. The Registry Repository is structured as a database. For example, the Registry Repository may be an SQL Server relational database management system, the Oracle7® database, etc. The Registry Server also contains an Access Control Library that is structured as a Java library.

The Administration Application contains Administration Application Modules, a Runtime Module, and an Access Control Library. The Administration Application Modules are structured as one or more HTML pages, CGI-based Java programs, or applets. The Runtime Module is structured as a C/C++ web server plug-in.

The Integration Tools comprise an Access Control Library, and sample program source code. Preferably, the source code is written in the Java® language.

The Access Server comprises an Authentication Client Module, Access Menu Module, Runtime Module, and an Access Control Library Lite. The Authentication Client Module and Access Menu Module are structured as one or more HTML pages or CGI-based Java programs. The Access Control Library Lite is one or more software components that interact to control access to the Access Server and its resources. The term "Lite" indicates that the access control components provide more limited functions, and are therefore more secure, than an Access Control Library.

The Protected Web Server comprises a Runtime Module and an Access Control Library.

The Runtime Module and Access Control Library are reused by several components, for example, the Runtime Module is used to protect resources on Protected Web Servers and system resources in the Access Server and Administration Application.

Protected Server

A Protected Server 104 preferably is a World Wide Web server that stores one or more resources 208 that are protected by a Runtime Module 206. In the preferred embodiment, Runtime Module 206 provides one or more functional services. For example, the Runtime Module functions to provide a Remote Configuration Service, an Authentication Verification Service, and an Authorization Verification Service. Each service is structured as a C/C++ web server plug-in. The Access Control Library 210 of the Protected Web Server functions to provide access to the Registry Server 108.

To associate a Protected Server 104 with system 2, the Administration Application 114 is used to enter information about the Protected Server. The information is stored in the Registry Repository 110. In the preferred embodiment, Administration Application 114 displays a Servers Administration screen. An administrator enters, for each Protected Server 104, an identifier; a name; a protocol; a port; a description; the location of an authentication server; URLs that identify pages displayed upon logout, upon login, and where restricted resources are encountered; the Protected Server on which cookies are stored; and the default time in minutes after which a cookie expires. The information is stored in Registry Repository 110.

When the Runtime Module 206 is initialized, it reads a configuration file and caches a list of all the resources 208 on the Protected Server 104 that need to be protected. Configuration changes, for example adding resources 208 to the Protected Server 104, are made using the Administration Application 114. When the Runtime Module 206 is notified of a change by the Administration Application 114, a Remote Configuration Service of the Runtime Module 206 uses the Access Control Library 210 to read updated information from the Registry Server 108.

The Protected Server 104 executes an HTTP Server 202 that sends and receives requests or messages conforming to Hypertext Transfer Protocol (HTTP). An example of the HTTP Server 202 is the public domain Apache Web server.

Figure 3A:
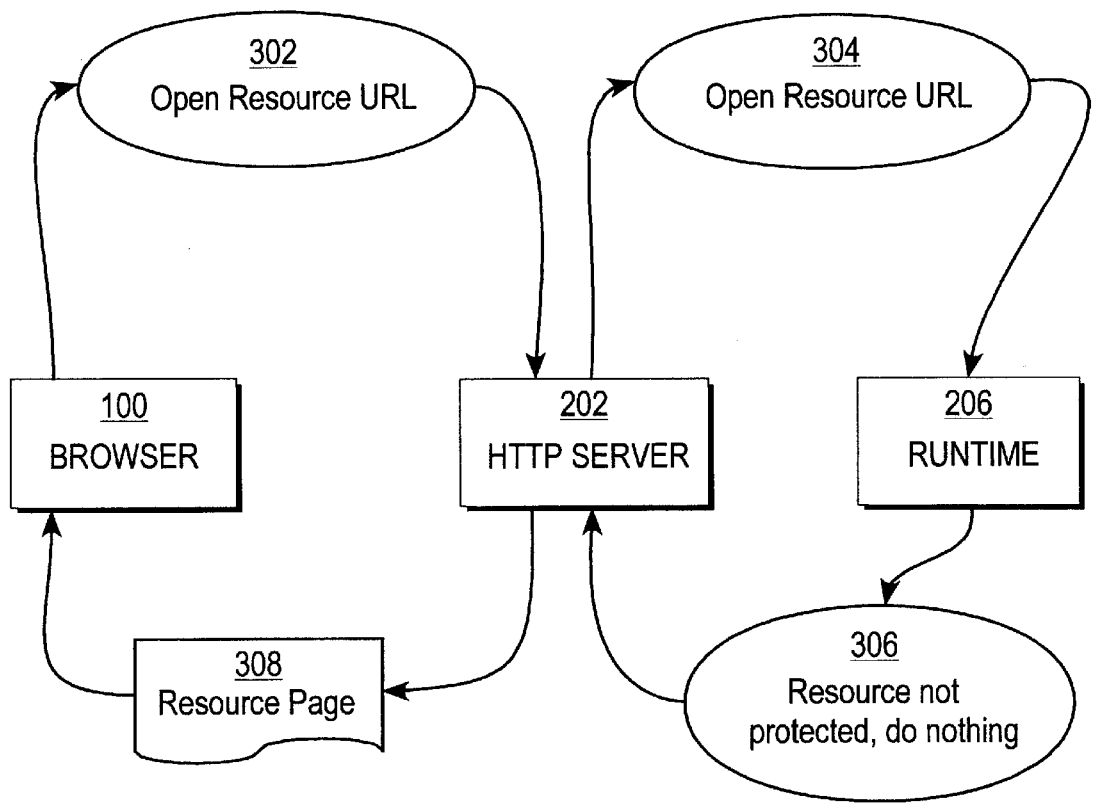
FIG. 3A is a state diagram showing actions carried out by a protected server.

FIG. 3A is a state diagram showing certain actions carried out by Protected Server 104. As shown by state 302, a browser 100 issues an HTTP request, such as "Open the Resource designated by this URL," and provides a URL as a parameter. For every HTTP request that is received, HTTP Server 202 sets a Web server environment variable "REMOTE_ADDR" equal to the Internet Protocol (IP) address of the requesting client or server. As shown by state 304, the HTTP Server 202 then calls the Runtime Module 206, which runs in the same process space as the HTTP Server, and passes it the browser's request. Runtime Module 206 determines whether the requested URL is a protected resource. If the requested URL is not a protected resource, then as shown by state 306, the Runtime Module takes no further action and passes control back to HTTP Server 202. As shown by state 308, the in response the HTTP Server 202 provides one or more Web pages containing the requested resource to the browser 100.

Figure 3B:
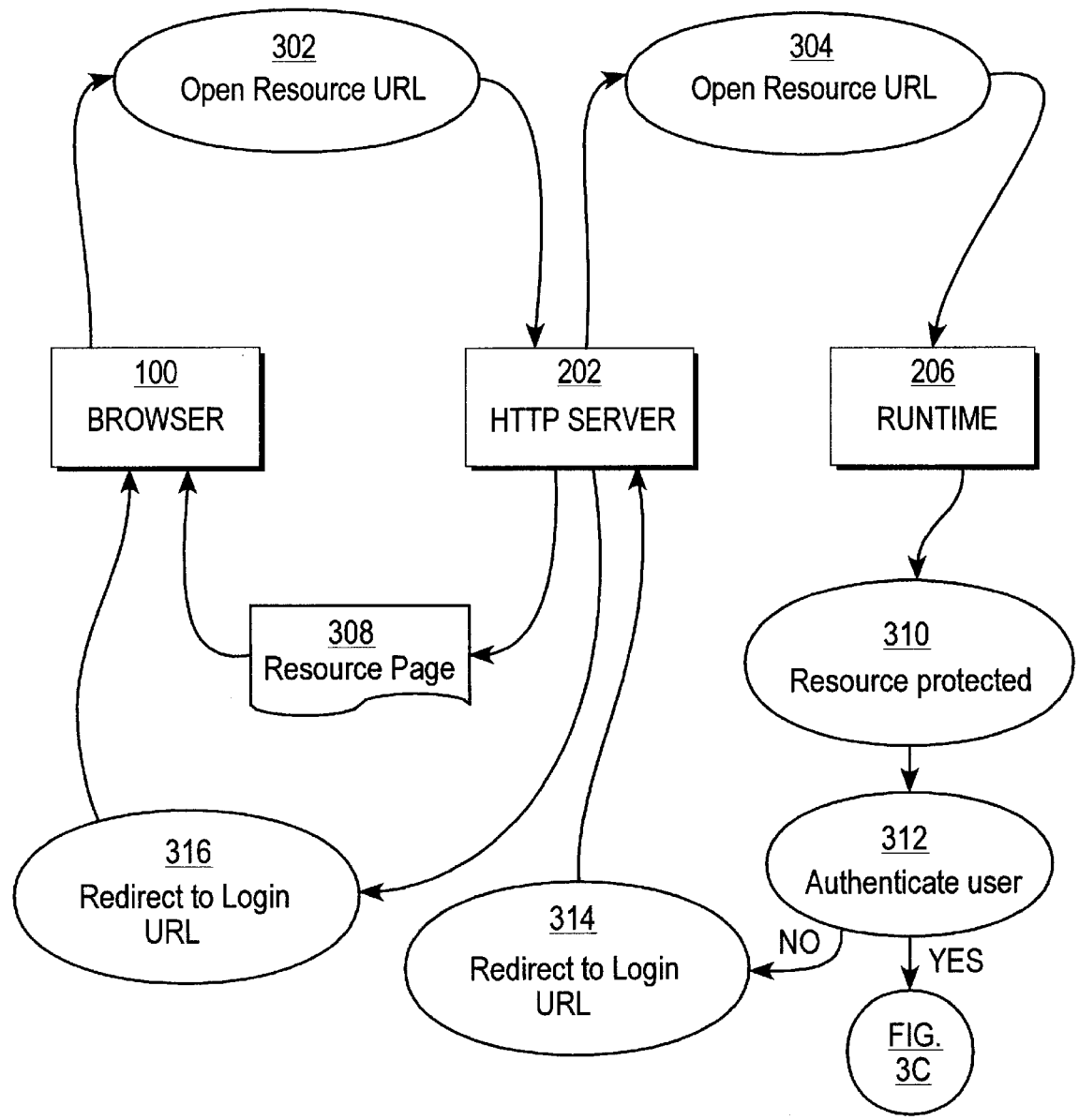
FIG. 3B is a state diagram showing a process of opening a protected resource.

FIG. 3B is a state diagram showing processes carried out when the URL is a protected resource. As shown by state 312, Runtime Module 206 calls the Authentication Verification Service to check whether an authenticated user is making the request. An authenticated user is one who has successfully logged into the system. A user is considered authenticated if the request contains a "user cookie" that can be decrypted, and the request's IP address matches that in the cookie. If the conditions are not satisfied, then the user cannot be authenticated, and as shown in state 314, Runtime Module 206 returns a redirection to the Login URL. As shown by state 316, HTTP Server 202 returns the redirection to the Login URL to the browser 100.

Figure 3C:
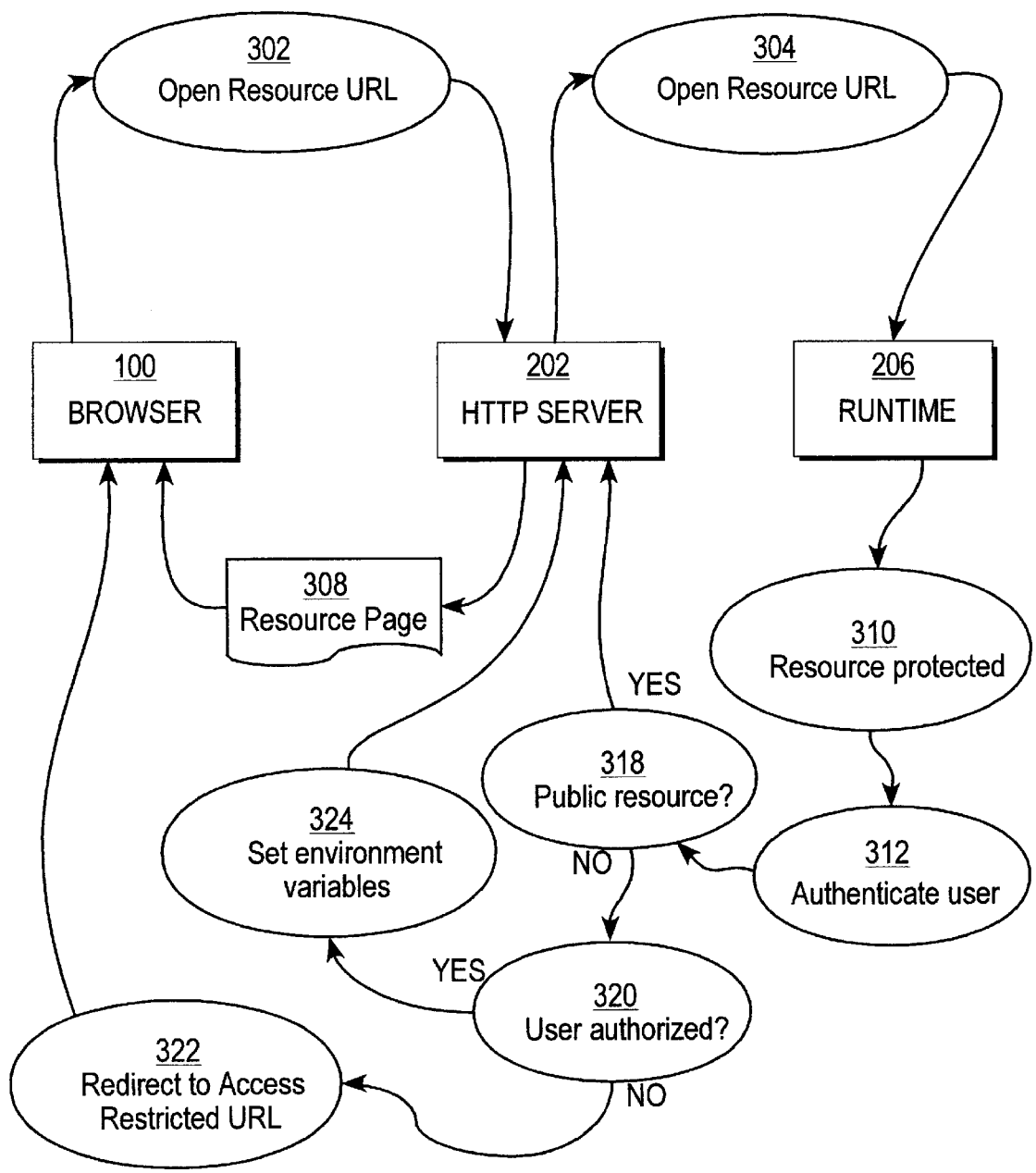
FIG. 3C is a state diagram showing a process of authorizing access to a restricted resource.

FIG. 3C is a state diagram showing processes carried out when the URL is a protected resource and the user is authenticated. After the user has been authenticated in state 312, Runtime Module 206 calls the Authorization Verification Service to check that the user has the right to access the protected resource. All authenticated users have the right to access "public" resources. In state 318, the Runtime Module 206 tests whether the resource is a public resource. If so, then Runtime Module 206 returns a direction to one or more resource pages, and HTTP Server 202 returns the redirection to browser 100, as shown by state 308.

If the resource is not a public resource, then a user is allowed access only if the user is authorized, as shown by state 320. In the preferred embodiment, state 320 involves testing whether the request from browser 100 contains a "roles cookie" that can be decrypted, and the user has one or more roles, in a combination defined by an Access Rule. Each Access Rule is a Boolean expression of one or more roles. In an alternate embodiment, state 320 involves testing whether the user has at least one role needed to access the resource. If these conditions are satisfied, then the user is deemed authorized. If these conditions are not satisfied, the user does not have authorization and the Runtime Module returns a redirection to a pre-defined URL, as shown by state 322. Preferably, the pre-defined URL identifies a Web page that displays the message "Access Restricted," or an equivalent warning that informs the user that it cannot access the requested resource.

If the user is authorized to view or use the protected resource, then as shown in state 324, Runtime Module 206 sets certain environment variables and passes control to the protected resource 208. In the preferred environment, a REMOTE_USER environment variable is set to the user's login name. A HTTP_LOCALE environment variable is set to the user's language code. A HTTP_ROLES environment variable contains the user's roles for this resource. The environment variables are set so that the protected resource 208 may display different information or behave differently depending upon the values of the environment variables. If the protected resource 208 is a static HTML page, then HTTP Server 202 passes the page directly to the browser 100. If the protected resource 208 is a CGI-based program, it can dynamically generate and return a custom HTML page based on the user's name and roles.

Access Server

Figure 4:
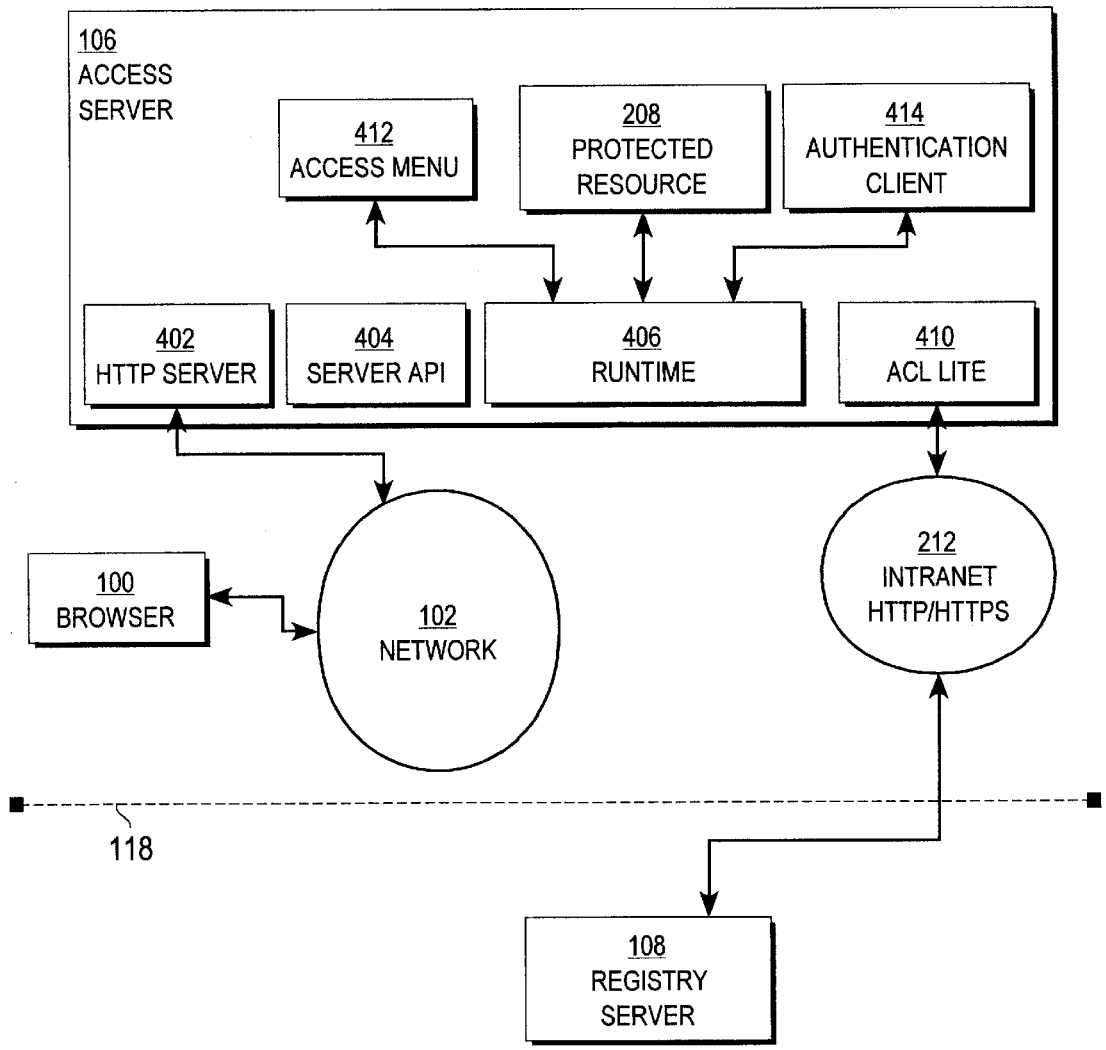
FIG. 4 is a block diagram of an access server used in the system of FIG. 1.

FIG. 4 is a block diagram of Access Server 106. An Access Server 106 is a Web server that authenticates users of the access system 2. In the preferred embodiment, Access Server 106 comprises an HTTP Server 402, Server Application Programming Interface (API) 404, an Authentication Client Module 414, Access Menu Module 412, Runtime Module 406, and Access Control Library 410.

HTTP Server 402 sends and receives messages and requests that conform to the HTTP protocol. Server API 404 enables external programs and processes to access functions of the HTTP Server 402. The Authentication Client Module 414 functions to provide an Authentication Service, Login Tracking Service, Profile Management Service, Authorization Service, and Logout Service. Each service is structured as one or more HTML pages, or CGI-based Java programs. The Access Menu Module 412 provides a Personalized Menu Service. It is also structured as one or more HTML pages or CGI-based Java programs. The Access Control Library 410 protects system resources and provides access to the Registry Server.

The Authentication Client Module 414 enables users to begin and end authenticated sessions and change their account profiles. The Authentication Service of Authentication Client Module 414 is invoked when a user opens the login page URL of the system 2. The Authentication Service is also invoked, as described above in connection with FIG. 2, FIG. 3A, FIG. 3B, and FIG. 3C, when a user tries to access a protected resource 208 without first logging in.

Figure 5A:
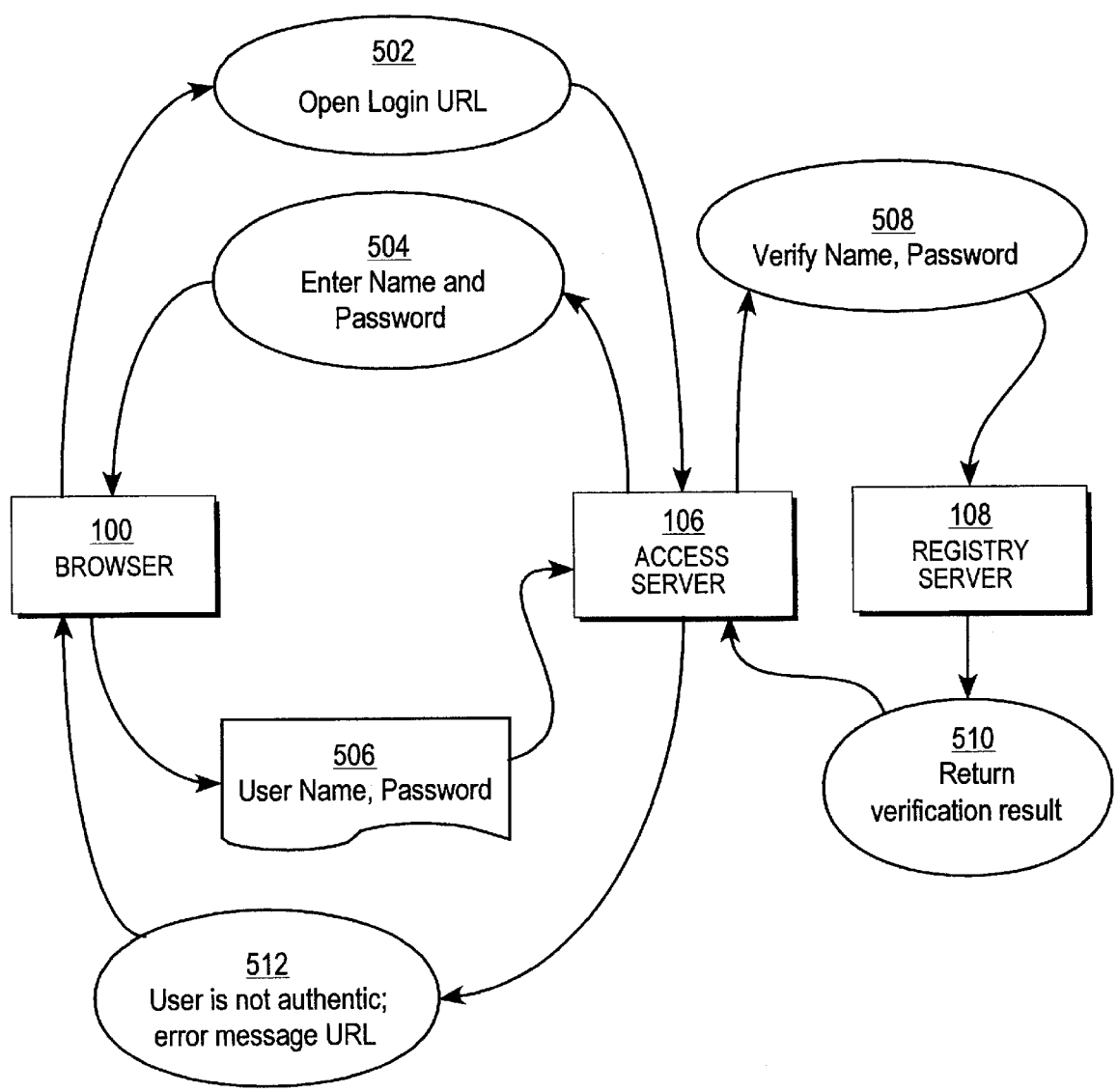
FIG. 5A is a state diagram showing steps carried out in a user verification process.

FIG. 5A is a state diagram of steps carried out by Access Server 106 in a preferred embodiment. As shown by state 502, browser 100 opens the URL of a login page. The login page prompts the user for a name and password, as shown in state 504. Preferably, a single login page is provided, regardless of the number of Web applications to which the user has access. Thus, the system 2 provides single secure log-in to Intranet or Extranet Web applications. The login page provides a single universal point of access to authorized applications and content.

The user enters the name and password into the login page using browser 100, which provides the name and password to Access Server 106. A user is considered authenticated if the name and password matches information stored in the Registry Server, as indicated by state 508. The Registry Server 108 returns the result of the verification step to Access Server 106, as shown by state 510. If the name and password cannot be authenticated or the account is marked inactive, then as shown by state 512, Access Server 106 returns an error message to browser 100.

For each login attempt, the Login Tracking Service logs the user's login activity. It saves the time of last successful and unsuccessful logins and number of consecutive, unsuccessful login attempts. The last successful and unsuccessful login times are displayed to the user after each successful login. Users can thus detect if someone else has attempted to use their account.

In the preferred embodiment, Administration Application 114 has a Login Monitoring function that displays a Login Monitoring data entry screen. An administrator may enter values that define the maximum consecutive unsuccessful login attempts allowed for a single user, and the number of minutes to lock an account when the maximum is reached. For multiple users, the Login Monitoring data entry screen accepts values for the maximum number of unsuccessful login attempts to track and the number of minutes during which unsuccessful login attempts are tracked. The administrator may also enable or disable email notification, and define a list of users who are notified when the system appears to be under attack.

Figure 5B:
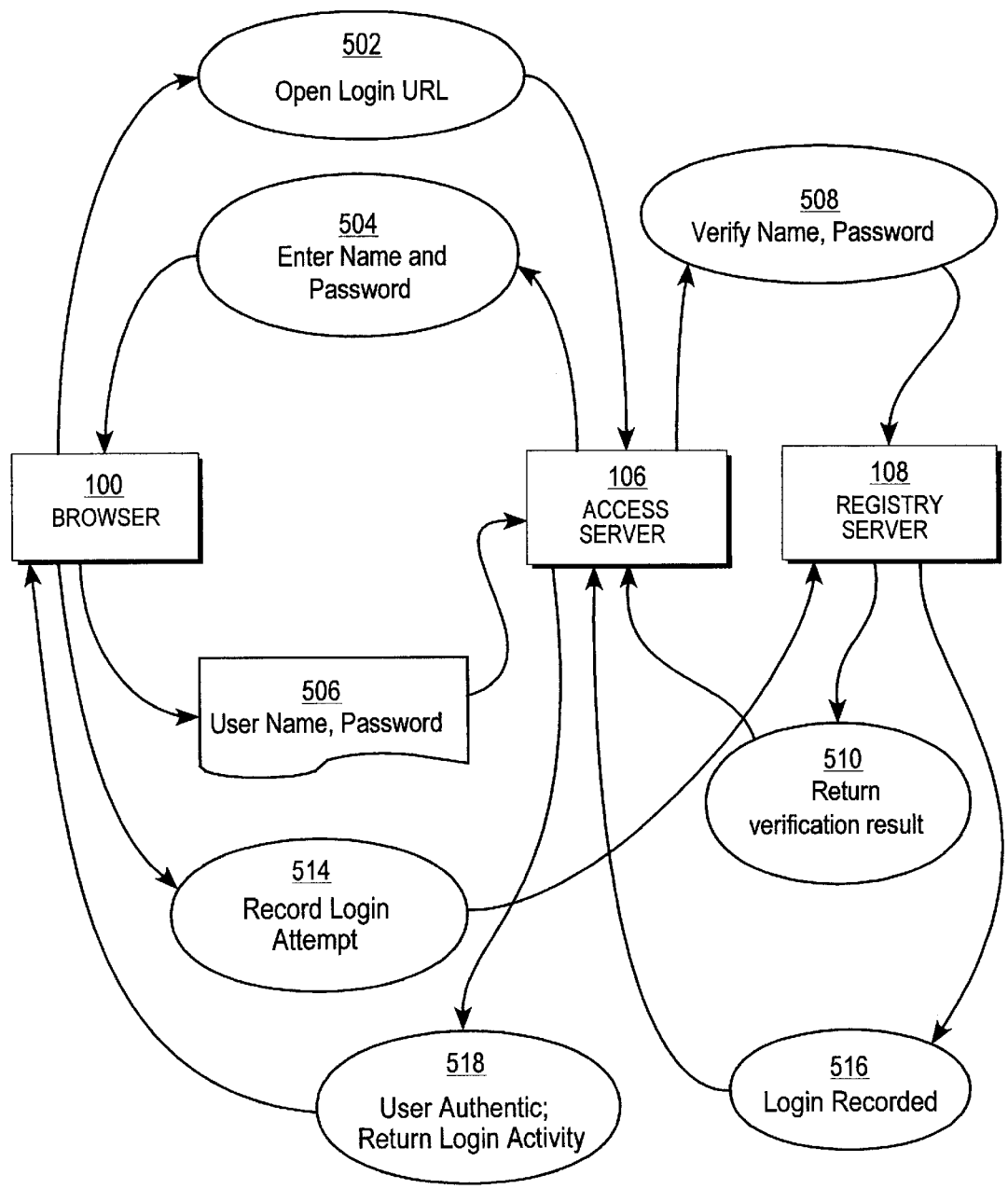
FIG. 5B is a state diagram showing steps carried out in a login process.

FIG. 5B is a state diagram showing steps carried out in the Login Tracking Service. As shown by state 502, state 504, state 506, state 508, and state 510, the foregoing user login steps are carried out. After Registry Server 108 returns the result of verifying the user's name and password, Access Server 106 requests Registry Server 108 to record a login attempt, as shown in state 514. In state 516, Registry Server 108 informs Access Server 106 that a login attempt has been recorded in persistent storage in Registry Server 108. If the user is an authenticated user, then as shown in step 518, the date and time of the user's last successful and unsuccessful login are returned by Access Server 106 to browser 100, which may display the date and time information.

If the number of consecutive unsuccessful login attempts by a user exceeds a pre-determined number, which may be set by the administrator set amount, then Registry Server 108 and Access Server 106 cooperate to disable the user's account for a pre-determined period of time. The pre-determined period of time may be configured by the administrator.

Registry Server 108 also stores a count of the total number of unsuccessful login attempts made by any registered or unregistered user within a pre-determined period of time, which may be set by the administrator. The value of this number may indicate that someone is trying to break into user accounts. Registry Server 108 automatically notifies the administrator of such suspicious activity by electronic mail.

Figure 5C:
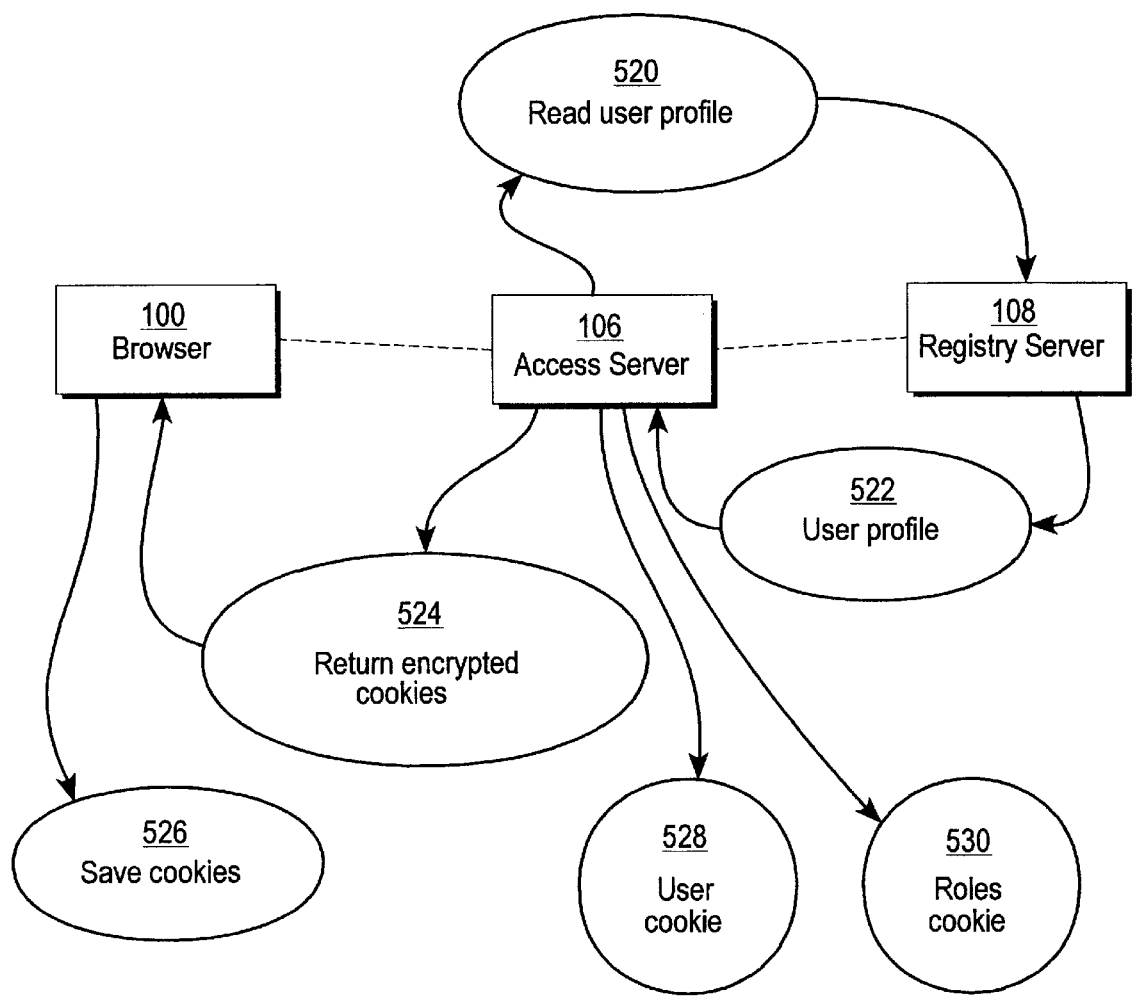
FIG. 5C is a state diagram showing steps carried out in generating user profile information.

FIG. 5C is a state diagram of actions taken by the browser, Registry Server 108, and Access Server 106 when a user is authenticated. After a user is authenticated, the Authentication Client module 414 calls the Authorization service of Access Server 106. In response, the Authorization service requests profile information about the user from the Registry Server 108, as shown by state 520. In state 522, Registry Server 108 returns the profile information to Access Server 106. The profile information may comprise the user's name, locale information, IP address, and information defining roles held by the user. The Authorization service creates a "user cookie" 528 and "roles cookie" 530, which are used to convey profile information to browser 100. The "user cookie" contains a subset of the user profile information. The "roles cookie" contains a list of the user's roles.

As shown by state 524, cookie 528 and cookie 530 are encrypted and returned to the browser 100. Alternatively, state 524 may involve digitally signing cookie 528 and cookie 530 using a digital signature algorithm. Preferably, the cookies are encrypted rather than digitally signed because encryption is faster and produces a smaller cookie. Each of the cookies 528, 530 is marked with or contains an expiration date value.

Cookie 528 and cookie 530 are saved in memory by the browser 100 indefinitely, unless either of the cookies expires, i.e., the system clock becomes equal to or greater than the expiration date value. The cookies 528, 530 are passed to each Web server that the user accesses and that is within the same domain as the Access Server 106. When a user quits the browser 100, cookies that have not expired are saved on a mass storage device associated with the browser 100, such as a disk drive located at the user's client machine or terminal. Cookies that have an expiration date value of 0 are never saved on disk. Administrators can apply security policies to the system by setting cookie expiration times based on their organization's security policies.

Figure 5D:
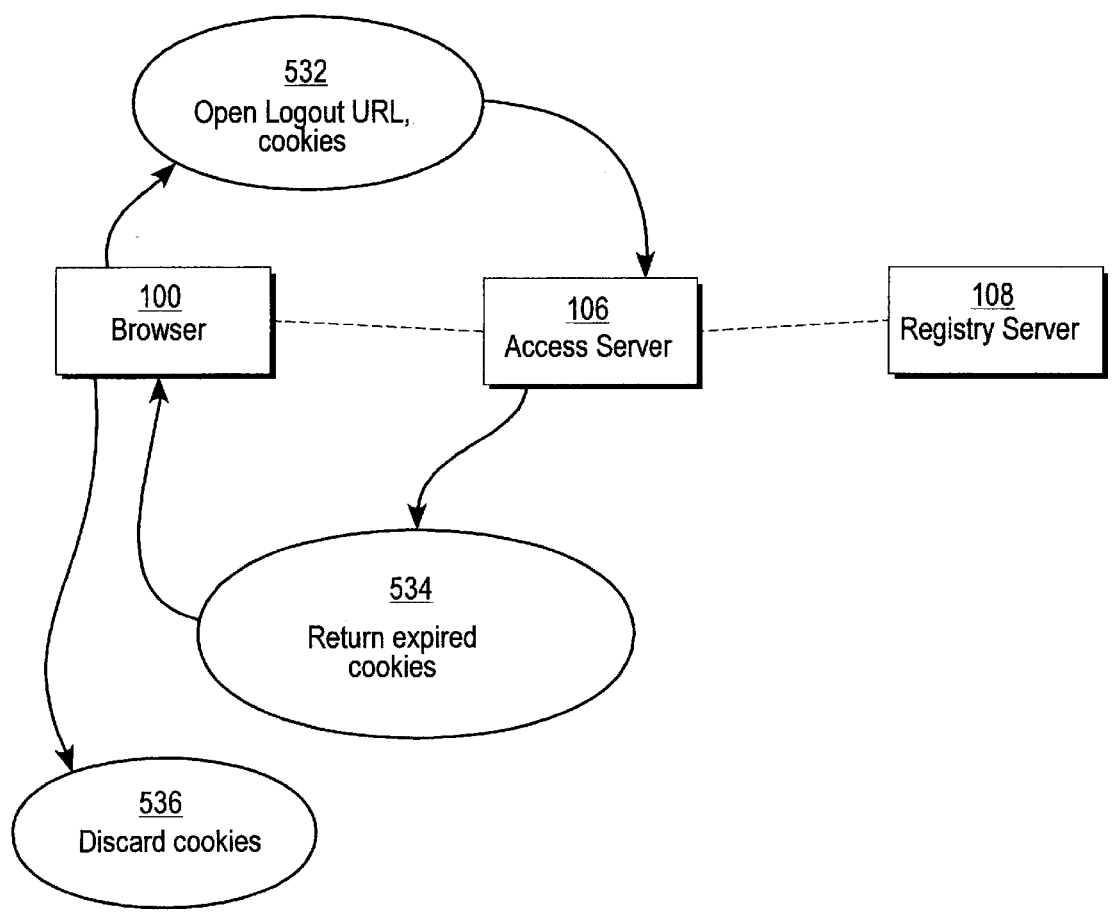
FIG. 5D is a state diagram showing steps carried out in a logout process.

FIG. 5D is a state diagram of steps carried out in logging a user out of the system 2. After accessing protected resources, users can logout by opening the URL of the system's logout page, as shown by state 532. In response, a Logout service of Access Server 106 returns encrypted cookies in the same manner as the Authorization service, as shown by state 534. The cookies returned in state 534, however, are invalid because their expiration time is in the past. Accordingly, as shown by state 536, browser 100 discards the expired cookies, and thereafter the user can access only pages that have been cached by the browser.

The Profile Management Service of Authentication Client module 414 enables a user to update the user's profile by changing password or locale information. Preferably, all passwords must have a number of characters that is equal to or greater than a pre-determined minimum length. The system administrator may set the minimum length. The system default minimum is six (6) characters and the maximum is 32 characters. Administrators may also define the time after which a user is prompted to change the user's password. This period can be set system wide or for each individual user. The system ensures that passwords are not reused.

Using a Localization Service of Runtime Module 206 of Access Server 106, a user can select the time zone, date format and the language in which the user wants to interact with resources. At run time, the Localization Service detects the user's locale settings based on information passed in HTTP requests from browser 100 to Access Server 106. The Localization Service uses the locale information to display messages in the user's language and display dates and times based on the user's time zone and selected date format.

Figure 5E:
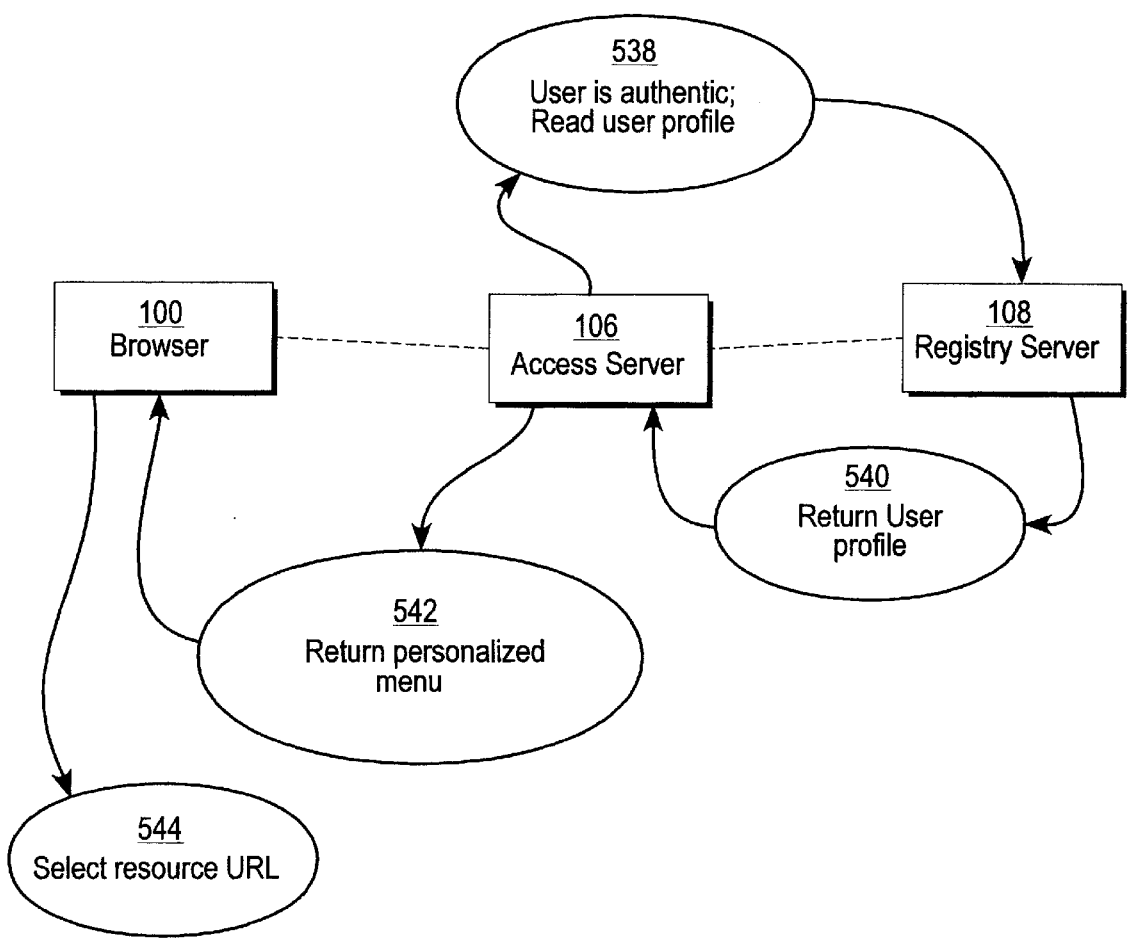
FIG. 5E is a state diagram showing steps carried out in a process of generating a personalized menu.

FIG. 5E is a state diagram of a method delivering a role-specific access menu to a network user. In the preferred embodiment, after the Authorization service of Authentication Client module 414 has looked up a user's roles from the Registry Server 108, Access Menu Module 412 uses a Personalized Menu Service to build a list of resources 208 that are available to the user. As shown by state 538, Access Server 106 determines that the user is authentic, using the steps described above, and requests Registry Server 108 to return a profile of the user. In state 540, Registry Server 108 returns profile information for the user to Access Server 106. In response, the Personalized Menu Service constructs a personalized menu of resources showing only those resources that the user is authorized to access according to the user's profile information, including the user's roles and privileges. Each resource is identified by an icon, or graphic button that accesses a URL, or by an icon and a text hyperlink. The text string is taken from the name of the resource in the Registry Server. As shown by state 542, the personalized menu is returned to the browser 100 in the form of a Web page or HTML document. In state 544, the user or browser 100 selects one of the resources listed in the personalized menu.

Significantly, in this configuration, after the personalized menu is returned to the browser, no additional login is required to access additional resources in the personalized menu, until the user logs off, quits the browser 100, or until the expiration time of the cookies is reached.

The format of the personalized menu is determined by an HTML template stored in Access Server 106. An application programmer or developer may further customize the look of personalized menus for a particular installation by editing a template or by using the Access Control Library to create custom code.

Registry Server

Figure 6:
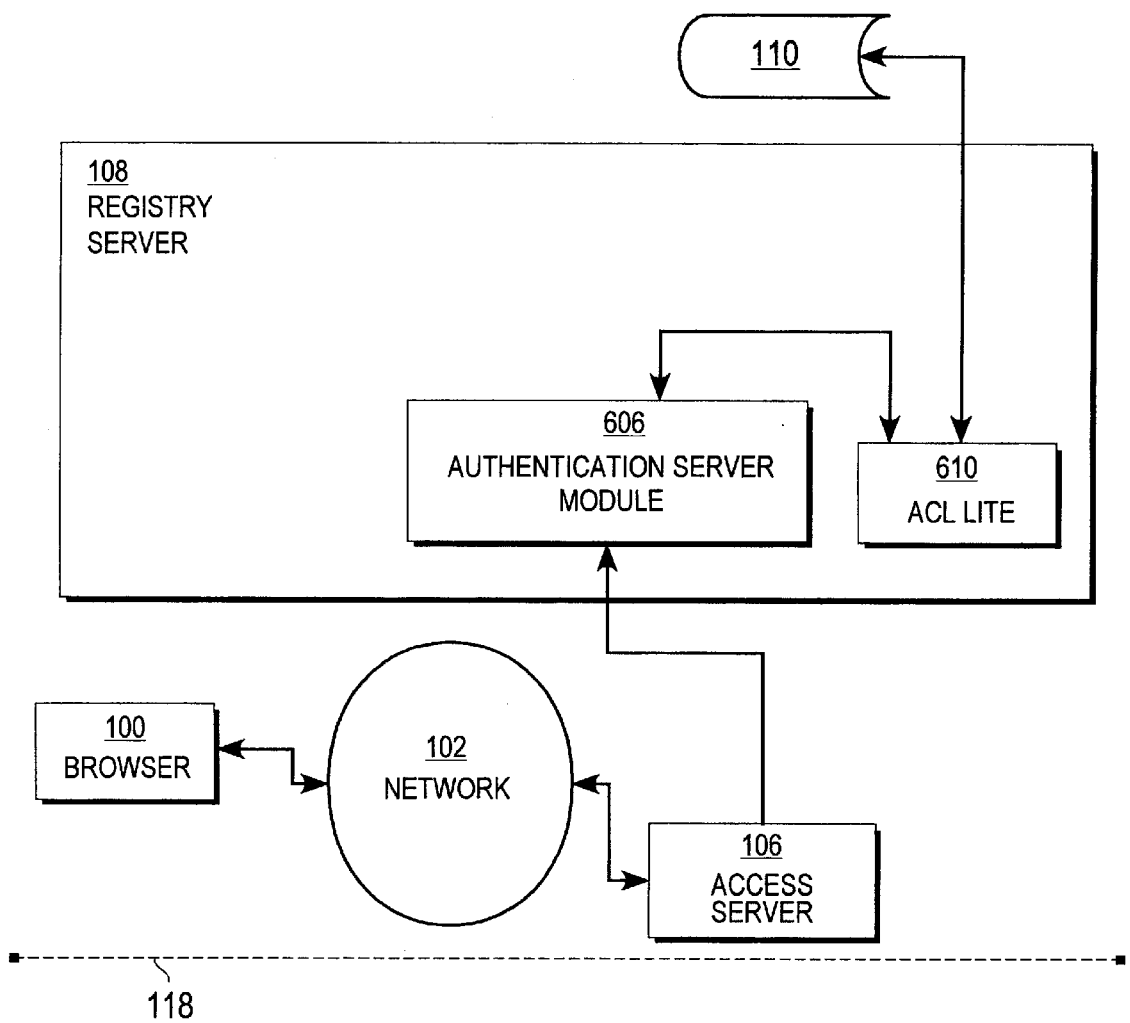
FIG. 6 is a block diagram of a registry server used in the system of FIG. 1.

The Registry Server manages access to the Registry Repository. FIG. 6 is a block diagram of a preferred embodiment of Registry Server 108, which comprises an Authentication Server Module 606, a Registry Repository 110, and an Access Control Library 610. Authentication Server Module 606 provides access to the Registry Repository 110, which stores User, Resource, and Role information. Access Control Library 610 also provides access to the Registry Repository.

Preferably, Authentication Server Module 606 is a multi-threaded Java server that handles remote procedure calls from the Access Server 106, Administration Application 114 and Runtime Module 206. The remote procedure calls are made using the API of Access Control Library 610, which preferably uses HTTP/SSL transactions that are encrypted for privacy. Authentication Server Module 606 accepts incoming remote procedure requests and uses Access Control Library 610 to make local procedure calls to read and write information in the Registry Repository 110. In this configuration, Authentication Server Module 606 can carry out HTTP communications with other elements of the system.

Registry Repository 110 is the primary data store for the system 2. It contains data on Users, Resources and Roles and configuration information required for the system 2 to function. Selected data, for example, passwords, are stored in Registry Repository 110 in encrypted form. The data about Users, Resources and Roles stored in Registry Repository 110 represents the structure of an enterprise or organization that has protected resources. Data in Registry Repository 110 is managed using Administration Application 114.

Preferably, Registry Repository 110 is implemented using a relational database with a stored procedure interface. Examples of suitable databases that can be used as the Registry Repository are the Oracle® database system or Microsoft SQL Server. Registry Repository 110 preferably is modular in order to enable support of Java Naming and Directory Interface (JNDI), Lightweight Directory Access Protocol (LDAP) and repositories from other vendors. Stored procedures increase performance because they are pre-compiled queries that are cached in memory by the database management system. In addition, a stored procedure can execute several database operations as one atomic operation and then commit or rollback the entire transaction.

Administration Application

Administration Application 114 is used by administrators to configure server components of the system, to set up user and resource records, assign roles to users and resources and manage changes to the system. The Administration Application provides these services by reading and writing information in Registry Server 108.

Figure 7:
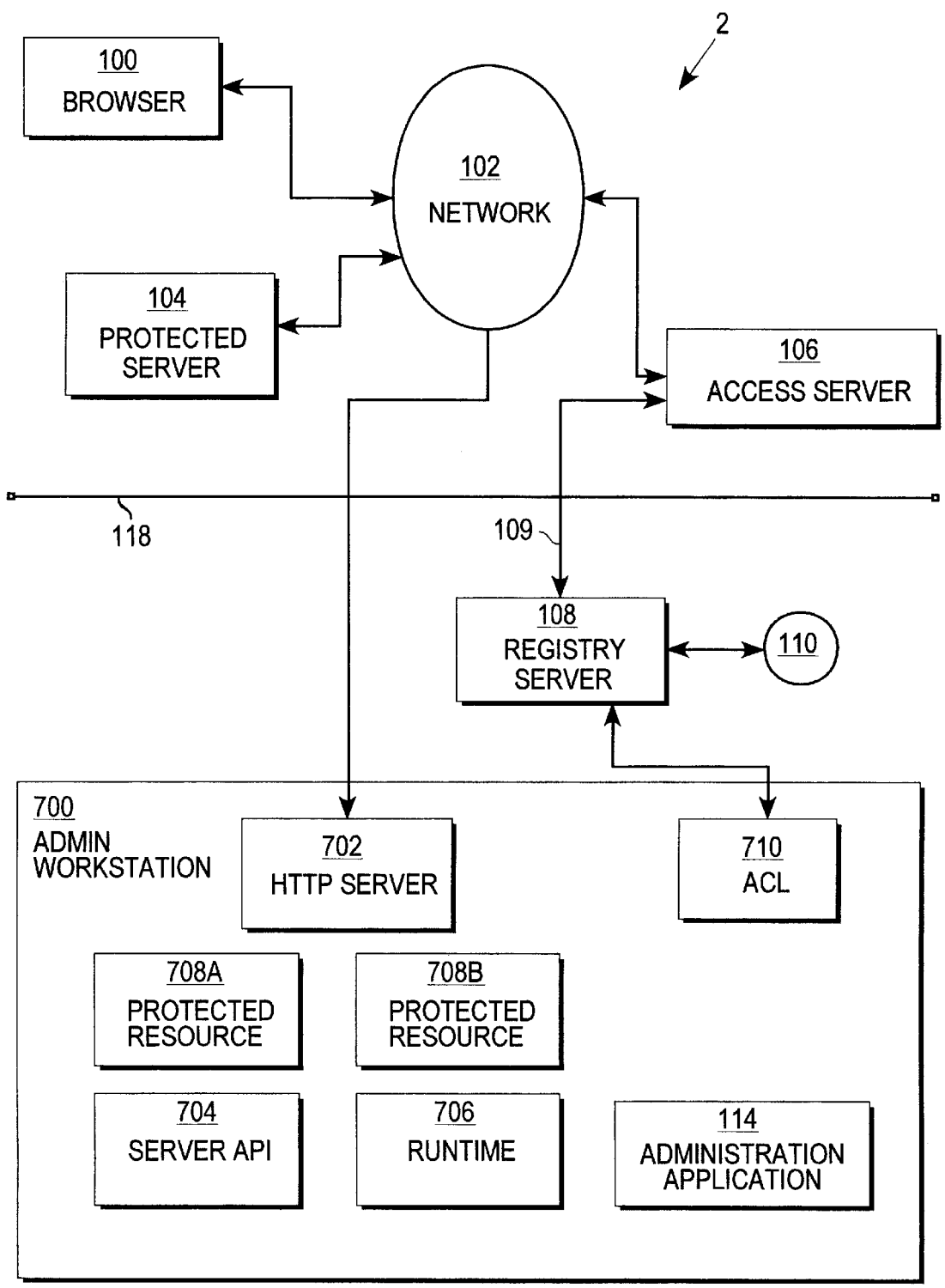
FIG. 7 is a block diagram of the system of FIG. 1 showing details of an administrative application.

FIG. 7 is a block diagram of a preferred embodiment of Administration Application 114 incorporated in an administrator workstation 700. Administrators use a standard web browser 100 to invoke the Administration Application. Preferably, browser 100 has frames, JavaScript and Java support. In the preferred embodiment, Administration Application 114 (also called Administration Application Module) is coupled to a Runtime Module 706, and an Access Control Library 710. Administration Application 114 can create, delete, modify and records in the Registry Repository 110; assign roles; perform bulk operations; generate reports; and configure the system. Also preferably, Administration Application 114 is structured as one or more HTML pages, CGI-based Java programs, or applets.

Using Administration Application 114, an administrator may find, list, create, delete and modify user, resource and role records. Each role record contains a name string, unique identifier, description string and additional fields or attributes. Each user record stores profile information. For example, the user record profile information includes the user's first and last names, email address, login name, password, locale, whether the account is active or inactive, and when the password or account will expire.

Administration Application 114 also enables an administrator to assign roles to users and resources and specify dates within which a role is effective. A user is authorized to access a resource if the user and resource share a role and the type of access is implicit in the role.

Administration Application 114 can also carry out operations on a set of users, for example add or delete roles or change their account status. The operations can be performed on all users or sets of users, for example those with a specific Role. Administration Application 114 can generate reports on users, resources and roles. Reports may list resources accessible to particular users, roles and users that can access particular resources or users and resources that have been assigned particular roles. A short report is returned as an HTML page to be displayed by browser 100. Longer reports are processed in the background and saved in a tab-delimited file. The URL of the report file is sent to the administrator by electronic mail.

Administration Application 114 can configure system wide parameters, for example, set URLs for system Login, Logout and Access Restricted pages and configure servers, for example, list server names, protocols and ports.

Establishing Groups, Roles, Resources, and Associations

Using the Administration Application to establish a system for controlling access to protected information resources involves making an inventory of the resources, defining roles, and creating profiles for roles and persons. The inventory step involves listing all existing and planned resources for which protection and controlled access is desired. For each resource, access privileges, roles, and functional groups are identified. These steps are carried out once initially to establish system 2, and may be repeated at any desired time to integrate additional roles, user types, and resources into the system. From the following discussion, a preferred arrangement of database tables and forms will become apparent.

Defining Roles

Defining roles involves identifying role names, identifying functional groups, and defining user types. It may also involve associating roles to user types. Roles are developed by listing functions or capacities in which a person might act when they access Web resources and their functional group, department, or organizational unit. Roles should accurately represent the actual work roles carried out by individuals in the organization and the current kinds and levels of access that are appropriate for the resources of the organization. As a list of roles is developed, duplicates are eliminated, and duplicate roles are combined. As a result, a normalized list of roles is created. Developing the list of roles may also involve eliminating roles that are really user types. User types are then defined.

Creating profiles involves associating roles with resources and users, as well as associating user types with users.

Defining Functional Groups

Preferably, the Administration Application 114 can display a Functional Group Administration data entry form that accepts information defining a functional group. An administrator may complete and submit the data entry form for each fumctional group to be defined. In response, Registry Server 108 stores information defining the functional group in the Registry Repository 110. Each functional group is defined by an identifier value, a name, and a description. The identifier value uniquely identifies a particular functional group. The name value is displayed to users and administrators working with the functional group, and need not be unique. The description value is any information about the functional group that would be useful to administrators.

Defining Roles

The Administration Application 114 can display a Roles Administration data entry form that accepts information defining a role. An administrator may complete and submit the data entry form for each role to be defined. In response, Registry Server 108 stores information defining the role in the Registry Repository 110. Each role is defined by a role identifier value, a role name, an associated functional group value, and a description. The role identifier value uniquely identifies a particular role, and is used internally only. The role name value is displayed to users and administrators working with the role, and need not be unique. The associated functional group value is one of the previously defined functional groups in which the current role belongs. Each role may be assigned to only one functional group. The description value is any information about the role that would be useful to administrators.

Defining Resources

The Administration Application 114 can display a Resource Administration data entry form that accepts information defining a role. An administrator may complete and submit the data entry form for each resource to be defined in the system 2 and protected by the system. In response, Registry Server 108 stores information defining the resource in the Registry Repository 110. Each resource is defined by a resource identifier value, a resource name, a description, a Web server, a Relative URL, and a list of protected resources.

The resource identifier value uniquely identifies a particular resource, and is used internally only. An example of a resource ID is "qsres". The resource name value is displayed to users and administrators working with the resource, and need not be unique. An example of a resource name is "Query String Resource". The description value is any information about the resource that would be useful to administrators. The Web server value identifies the server on which the resource exists, by global top-level domain, primary domain name, secondary domain name, and (optionally) port. An example of a Web server value is "montana.encommerce.com:80".

The Relative URL value identifies a location of the resource relative to an HTML directory of the Web server identified by the Web server value. An example of a Relative URL value is "/cgi-bin/salesreport.exe?project=sales&report=quarterlystatus".

The list of protected resources identifies one or more locations of resources for which access control is desired when a user attempts to connect to the specified Web server and Relative URL. The list of protected resources may identify resources by a literal name, such as a file name of an executable program, or by a name that includes one or more wildcard characters. When a name with wildcard characters is specified, the system can protect an entire directory, subdirectory, group of files or documents, etc., using a single resource identifier. In the preferred embodiment, the foregoing information is entered in a Create Resource screen, i.e., a Web page form that an administrator fills in and submits to system 2, e.g., by pressing a SAVE button. Preferably, to facilitate construction of the list of protected resources, the Create Resource screen displays a scrollable list of the protected resources, a resource name text field, an ADD button, REPLACE button, REMOVE button, and a CLEAR ENTRY button. The list of protected resources is prepared by entering a text string in the resource name field and selecting the ADD button, which adds the string to the list. Alternatively, selecting the REPLACE button causes the string to replace a previously entered resource name. Selecting the REMOVE button, after selecting a previously entered resource name, deletes that name from the list. Selecting the CLEAR ENTRY button resets the list to a null state, so that no resource names are displayed or stored in association with the current resource identifier.

Defining User Types or Person Types

The Administration Application 114 can display a User Type or Person Type Administration data entry form that accepts information defining a user type. An administrator may complete and submit the data entry form for each user type to be defined in the system 2 and protected by the system. In response, Registry Server 108 stores information defining the user type in the Registry Repository 110. Each resource is defined by a user type identifier value and a description value. The user type identifier value uniquely identifies a particular user type, and is used internally only. The description value is any information about the resource that would be useful to administrators.

Defining Users

Preferably, the Administration Application 114 can display a User Administration data entry form that accepts information defining a user. An administrator may complete and submit the data entry form for each individual user to be defined. In response, Registry Server 108 stores information defining the user in the Registry Repository 110. Each user is defined by personal information, login and password information, and account information.

Preferably, the personal information comprises a first name value, a last name value, an email address value, and a user type value. The first name value, last name value, and email address correspond to the name and address of the individual user. The user type value is one of the previously defined user type values stored in the Registry Repository 110. The login and password information preferably comprises a login name and password value for the user.

The account information comprises a Change Password value, an Account Status value, an Account Expiration Date value, a Locale value, a Time Zone value, and a Date Format value. The Change Password value is the number of days after which a user must change the user's password. The Account Status value indicates whether the user's account is active, suspended, or permanently inactive. The Account Expiration Date value identifies a date on which the user's account expires and becomes invalid. The Locale value identifies a language and a country or geographic region associated with the user, such as "English—United States" or "French—Canada." The Time Zone value identifies a world time zone in which the user is physically located. The Date Format value specifies how date and time values are to be displayed at the browser 100.

Defining Administrative Roles to Delegate Administration Functions

In many contexts, centralized administration of a system is undesirable. To overcome this problem, Administration Application 114 can delegate administration of users, roles, servers or the system to other administrators. The system 2 defines a special type of role, called an Admin Role. When the Admin Role is assigned to a user, that user has the right to perform administrative functions. An example of an Admin Role is "Help Desk Administrator." An enterprise might have a dozen such administrators located at various sites of the enterprise.

Each Admin Role is defined by an Administrative Role ID value, an Administrative Role Name, a Functional Group value, a Description, an Administrative Privilege, and a Server Configuration value.

The Administrative Role ID value uniquely identifies the Admin Role. The Administrative Role Name value is the name of the Admin Role that is displayed to users and administrators working with the Admin Role. The Functional Group value identifies one of the functional groups that is associated with the Admin Role. Each Admin Role may be assigned to only one functional group. In one embodiment, the Administrative Privilege value has one of the four exemplary values set forth in Table 1, which describes the administrative functions that can be carried out by each of the privilege levels. The Server Configuration value indicates whether this Admin Role can modify server configuration information.

TABLE 1

ADMINISTRATIVE FUNCTIONS

| FUNCTION | ADMINISTRATION PRIVILEGE LEVEL | | | |
|---|---|---|---|---|
| | Help Desk | Role Admin | User Admin | System |
| find, view a user record | YES | YES | YES | YES |
| reset user's password | YES | NO | YES | YES |
| view user's roles | YES | YES | YES | YES |
| assign, remove particular roles from user records | NO | YES | YES | YES |
| create, delete, modify user records | NO | NO | YES | YES |
| all administrative functions except those defined by the configuration privilege | NO | NO | NO | YES |

For example, consider a user who is defined in the Registry Repository as having a Record Type of User, a Record Name of Harvey, and a Role of Hotline Staff. A field in the Admin Role record specifies whether that user is assigned the "configuration privilege". This privilege allows an administrator to configure and maintain servers in the system. For example, the Registry Repository contains a record having a Record Type of Admin Role, a Record Name of Hotline Staff, a Configuration Privilege of No, and an Administration Privilege of HelpDesk Admin. Another field in the Admin Role record specifies the set of administrative functions that may be performed.

The Help Desk privilege may be delegated to hotline staff to allow them to handle the most common support questions. For example, hotline staff can help users who have forgotten their account passwords by resetting their passwords.

The Role Admin privilege may be delegated to owners of a particular resource, for example the technical support database. Administrators in the Technical Support Department would be able to control who has access to that resource by assigning or removing roles associated with that resource from user accounts. The list of roles that may be managed by an administrator with this privilege is limited to the roles that have been assigned to their associated Admin Role record.

For example, consider a user described in the Registry Repository 110 having a Record Type of User, a Record Name of Terry, and Roles described as TechSupport Administrator. There can be an administrative role described by a record of Registry Repository 110 having a Record Type of Admin Role, a Record Name of TechSupport Administrator, a Configuration Privilege of No, an Administration Privilege of Role Admin, and having Roles of TechSupport Manager, TechSupport Staff.

The system is installed with a "super user" or "SuperUser Administrator" account that is assigned an Admin Role with Configuration Privileges and System Administration Privileges. The super user account can be used to configure, populate and maintain a system. In particular, the super user account can be used to delegate administration by creating Admin Role records and assigning them to user records. In the preferred embodiment, the super user account is described in the Registry Repository 110 as having a Record Type of User, a Record Name of "websecadm," and Roles of SuperUser Administrator. There is also a record having a Record Type of Admin Role, a Record Name of SuperUser Administrator, a Configuration Privilege of Yes, and an Administration Privilege of System.

In other embodiments, the privilege levels may be user-defined. For example, an administrator may specify a name for a privilege level, and selectively assign or un-assign each of the Functions identified in the table above. In still another embodiment, an administrator may specify aspects of the functions as well. In yet another embodiment, the administrator may specify how a user having each privilege level is authenticated, for example, using a username and password as well as a digital certificate, secure token, one-time password card, etc.

Modifying Functional Groups, Roles, Resources, and Users

In the preferred embodiment, each of the data entry forms and screens described above further comprises a Create button, a Modify button, and a Delete button. The Create button is used to create a new record using the above-described forms, to enter new data, and to save the data that is entered. The Modify button is used to access an existing record of one of the forms, to modify the data or enter new data, and to save the modified data. The Delete button is used to retrieve and review an existing record and command system 2 to delete that record. These functions of the Create, Modify, and Delete button are implemented in the Administration Application.

Figure 10A:
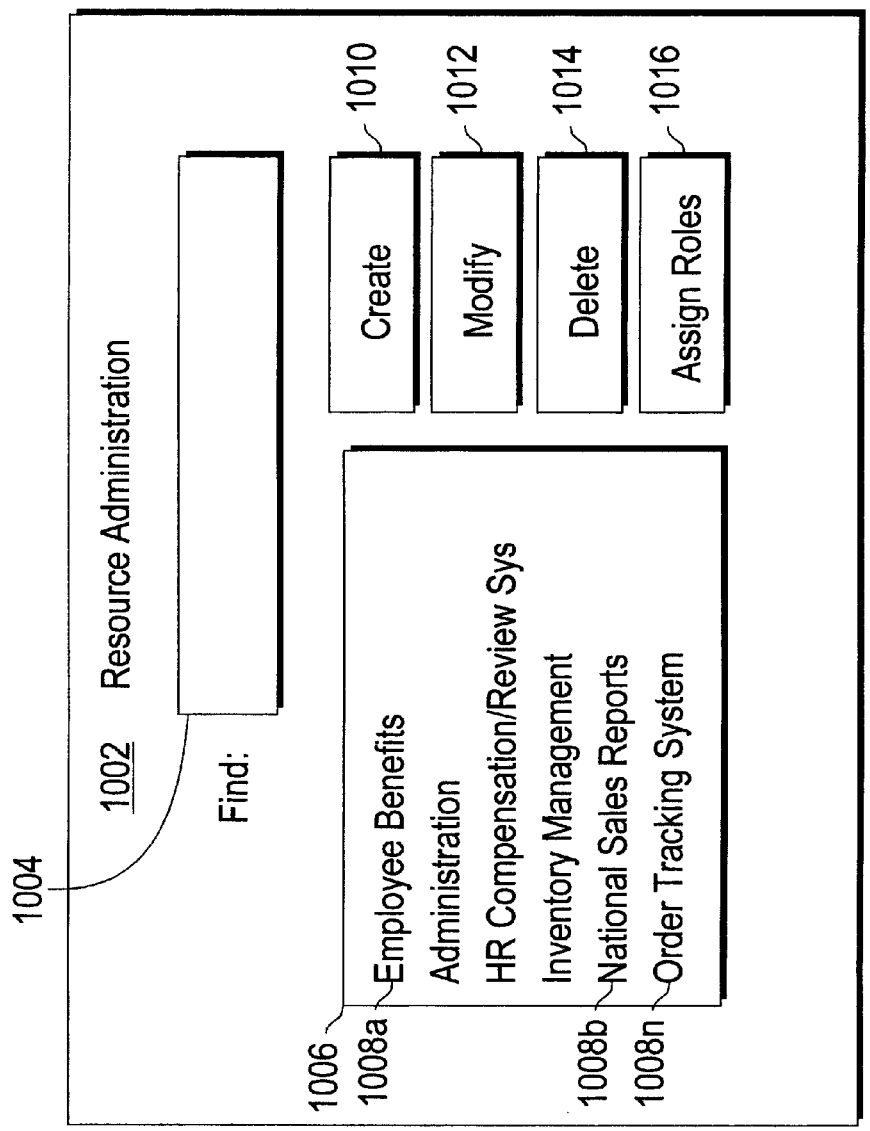
FIG. 10A is a block diagram of a resource administration user interface display.

FIG. 10A is a simplified block diagram of an exemplary screen display or HTML, page 1002 that is generated by Administration Application 114 for display by browser 100 when a Resource Administration function is selected. Page 1002 comprises a Find field 1004, a list 1006 of existing resources 1008a–1008n, a Create button 1010, a Modify button 1012, a Delete button 1014, and an Assign Roles button 1016. When the list 1006 is long, it may be difficult to locate an existing resource. A user may enter keywords describing a resource in the Find field 1004 and then select or click on one of the buttons 1010, 1012, 1014. In response, Administration Application 114 will attempt to find and display existing information about the resource from Registry Repository 110. The Create button 1010, Modify button 1012, and Delete button 1014 are used to access create, modify, and delete functions as described above.

Associating Roles with Resources

Figure 10B:
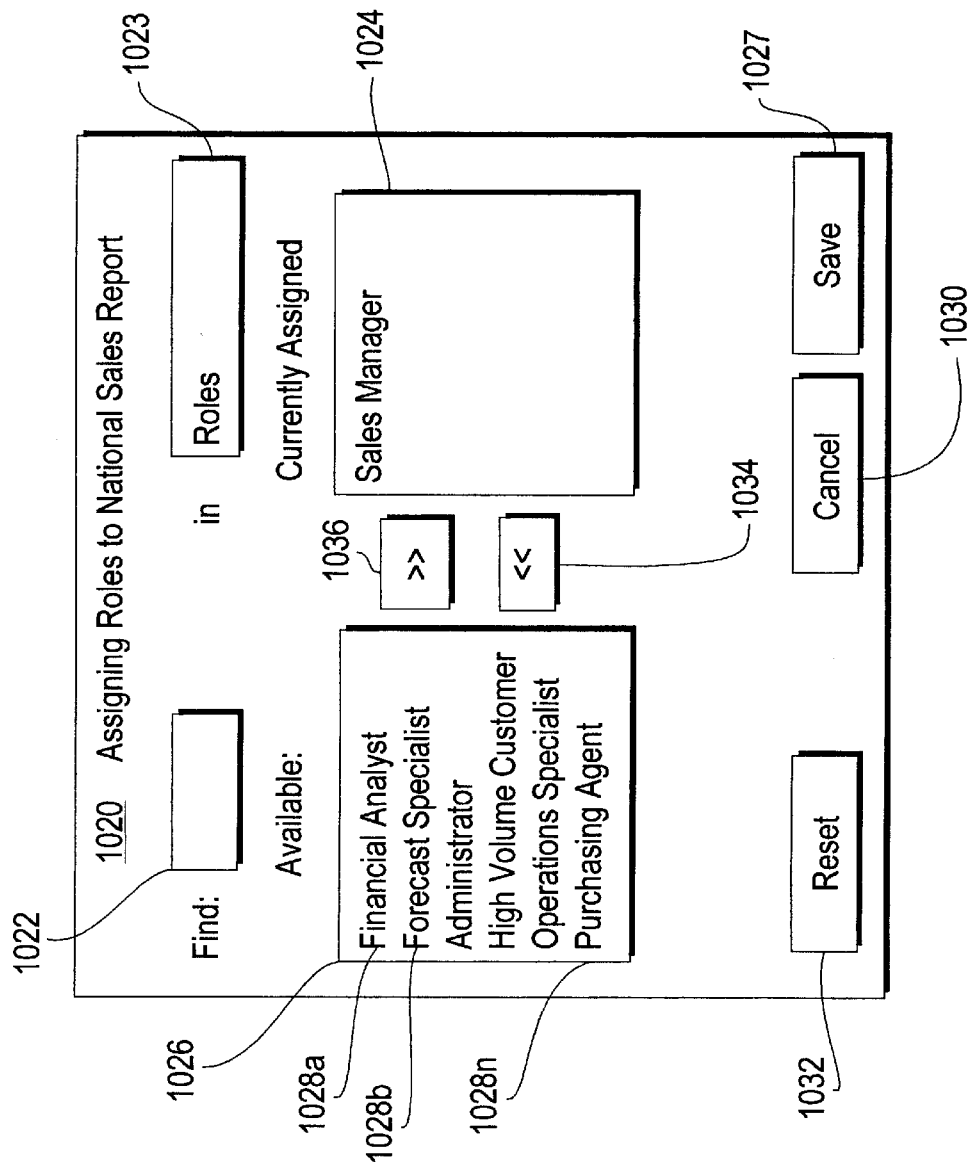
FIG. 10B is a block diagram of a role assignment user interface display.

An administrator may create an association of a role with one or more resources, in Registry Repository 110, by selecting one of the resources 1008a–1008n from the list 1006 and then selecting the Assign Roles button 1016 shown in FIG. 10A. In response, Administration Application displays a role assignment display for the selected resource. FIG. 10B is a simplified block diagram of a role assignment display 1020. The display 1020 preferably comprises a Find field 1022, a search domain field 1023, a list 1026 of available roles 1028a–1028n, an assigned roles list 1024, an Assign button 1036, an Unassign button 1034, a Save button 1027, a Cancel button 1030, and a Reset button 1032.

The title of display 1020, "Assigning Roles to National Sales Report," indicates that the user selected the resource "National Sales Report" 1008b from the list 1006 of FIG. 10A. To create an association of a role to the selected resource, a user selects one of the roles 1028a–1028n from the list 1026 and selects the Assign button 1036. In response, Administration Application 114 displays the selected role (such as "Sales Manager") in the assigned roles list 1024. The user or administrator may make the displayed association persistent in the Registry Repository 110 by selecting the Save button 1027. In response, Administration Application creates an association of the "Sales Manager" role to the "National Sales Report" resource and stores the association in the database.

By these actions, the user specifies that persons having the role of "Sales Manager" are authorized to view or use the "National Sales Report" resource. Any user who is assigned the role of "Sales Manager" in the future will automatically have access to the "National Sales Report" resource. If the administrator later un-assigns "Sales Manager" from the "National Sales Report" resource, then all users associated with the "Sales Manager" role will automatically lose access to the resource.

The administrator may cancel the displayed association by pressing the Unassign button 1034. If multiple roles are displayed in the assigned roles list 1024, and the administrator wishes to remove all of them, the administrator may either press the Unassign button 1034 multiple times until all roles are un-assigned. Alternatively, the administrator may press the Reset button 1032, which clears the assigned roles list 1024.

When the list 1026 of roles 1028a–1028n is long, it may be difficult to locate a particular role for assignment. A user may enter one or more keywords describing a role in the Find field 1022 and then select or click on a "Find" activation button or graphic. In response, Administration Application 114 will attempt to find and display existing information from the domain indicated in the search domain field 1023, from Registry Repository 110, and display or highlight the role in the list 1026. Roles may be defined and stored in one or more searchable domains. The administrator may select a domain of information as the source of role information by selecting the desired domain from a pull-down list displayed in the search domain field 1023. Examples of domains that may serve as a source of assigned information include Roles, Resources, and Functional Groups.

Working With Groups of Users

FIG. 10C is a simplified block diagram of a user interface display 1040 that is generated by Administration Application 114 to enable operations to be carried out for a group of users. In the preferred embodiment, when Administration Application 114 is invoked by an administrator using browser 100, it generates a top-level menu for display by the browser. The top-level menu includes a Groups button. The display 1040 is generated in response to selection of the Groups button. Alternatively, the display 1040 is displayed in a frame of a Users screen of the Administration Application.

Display 1040 preferably comprises a Find field 1042, a user parameter pull-down list 1043, a list 1046 of available users 1048a–1048n, a list 1044 of users who are assigned to a group, an Assign button 1047, an Unassign button 1045, a Reset button 1054, an Add Roles button 1056, a Remove Roles button 1052, and a Change Status button 1050.

To create a set of users to work with, an administrator or other authorized user selects one of the users 1048a–1048n from the list 1046 and selects the Assign button 1047. In response, Administration Application 114 displays the selected user, such as user "Bruce Ward" 1048n in the example of FIG. 10C, in the assigned users list 1044. The user or administrator may add as many users as desired. When the user determines that the group is complete, the user selects the Add Roles button 1056, Remove Roles button 1052, or Change Status button 1050 according to the function that the user desires to carry out for the group. In response, Administration Application displays an appropriate data entry screen, receives data entered by the user, and stores the data in the Registry Repository 110 in association with each user in the group.

The administrator may remove a user from the group by pressing the Unassign button 1045. If multiple roles are displayed in the list 1044, and the administrator wishes to remove all of them, the administrator may either press the Unassign button 1045 multiple times until all roles are un-assigned. Alternatively, the administrator may press the Reset button 1054, which clears the assigned roles list 1044.

When the list 1046 of users 1048a–1048n is long, it may be difficult to locate a particular role for assignment. A user may enter one or more keywords describing a user in the Find field 1042 and then select or click on a "Find" activation button or graphic. In response, Administration Application 114 will attempt to find and display existing information about the user from Registry Repository 110 and display or highlight the user in the list 1046. The Find function may be carried out based upon a user name or other user information. The administrator may select a value as the basis of the Find function by selecting the desired parameter from pull-down list 1043.

The foregoing example describes creating a set or group of users based upon names of the users. Alternatively, users may be selected and added to a group by role or user type.

Access Control Library

Access Server and Administration Application use the Access Control Library (ACL) to make remote procedure calls to Registry Server 108. Authentication Server Module of the Registry Server 108 uses the ACL to make local procedure calls to the Registry Repository 110.

Remote procedure calls to Registry Server 108 are authenticated using digital certificates, encrypted, and encapsulated within HTTP transactions. If a target Registry Server 108 does not respond to a remote procedure call, the call is automatically re-routed to an alternative Registry Server. This results in increased performance due to load balancing and increased reliability due to redundant operations.

Preferably, each Registry Server 108 is installed within a secure network or Intranet. Each Access Server 106, however, may be installed in a relatively less secure network or extranet. A subset of the Access Control Library is installed on Access Servers 106 so that if security is compromised on that server, the Access Control Library cannot be used to damage information in the Registry Repository 110.

Preferably, local procedure calls to the Registry Repository 110 are made using a JDBC driver. The driver uses an RDBMS network protocol to read and write information in the Registry Repository 110. For example, the RDBMS network protocol is SQL*Net v2.0 which is used to access an Oracle database. For encryption, the libraries commercially available from RSA Data Security of San Mateo, Calif. are preferred.

The Access Control Library also includes a Public API that enables application programmers or developers to customize the system 2. For example, in the preferred embodiment, the ACL exports Java® classes called UserResourceMenu and UserAPI, which may be used by developers to provide several services. As an example, the classes can be used to customize the look of a personalized menu; the developer edits a template and specifies the background, banner and buttons. The developer can further customize a personalized menu by extending the UserResourceMenu class to provide additional functionality, for example, to display a hierarchy of resources that a user may navigate. The developer may enable resources to read custom fields in a User's profile, for example a User's date of birth. For security reasons, user password cannot be read or written. Further, the developer may configure import/export utilities to synchronize User records in the Registry Repository 110 with records in other data stores.

A detailed description of the Access Control Library Public API is set forth in APPENDIX 1 to this document.

Integration Tools

In the preferred embodiment, system 2 includes templates and sample code, collectively designated as Integration Tools 115 of FIG. 1, which may be used by developers to customize the system and integrate resources into the system. For example, Integration Tools 115 enable developers to customize the look of Personalized Menus, implement custom self-registration policies and add custom fields to user records.

The system provides a central repository for user information in the form of Registry Repository 110, but enterprises may have existing stored information about users of other information systems. For example, an enterprise may have resources with proprietary authentication and authorization data stores. It is desirable to batch load user information from such data stores. In order to co-exist with multiple data stores, the Access Control Library (Public API) may be used to import, export and synchronize information with other data stores using, for example, LDAP or JNDI. For security reasons, user passwords may not be read or written.

The system 2 simplifies the development and deployment of new web resources by allowing developers to leverage its authentication and authorization services while focusing on core application functionality. When an authenticated user selects the resource, Runtime module 206 will set environment variables and pass control to the resource. The resource may read the user's name and roles from REMOTE_USER and HTTP_ROLES and additional attributes from Registry Server 108. The resource may then return information in HTML pages, customized, based on the individual user.

Such "legacy" resources generally have their own proprietary client applications, client-server protocols and data stores containing authentication and authorization information. In order to integrate with system 2, such resources must be Web-enabled and have the ability to export information in HTML pages. Generally, such resources are provided with one or more CGI-based programs that accept browser requests to a Web server and return information from the legacy data store, formatted in dynamically generated HTML pages. Alternatively, the legacy data may be integrated with an intelligent front end, such as Apple® WebObjects®.

Before a legacy resource can service the request, the user must be authenticated and authorized. This may be done in several different ways. As one example, the resource may assume that all requests to it have been authenticated and authorized. It can disable legacy authentication and authorization services and use environment variables. As a second example, the resource may assume that the request is authenticated but may not be able to use system roles. It may have to lookup authorization attributes from the legacy data store. The resource may get the user's name from REMOTE_USER or it may have to map REMOTE_USER to a name in the legacy data store. It may look for this mapping in the Registry Server using the Access Control Library (Public API).

As a third example, assume the resource cannot be modified and the CGI program must imitate the proprietary client application. In this case, the CGI program may have to use REMOTE_USER to get the user's name and password in the legacy system from the Registry Server. It can then use this information to login and access the legacy resource.

Customization

As described above, in the preferred embodiment, system 2 comprises a plurality of templates stored in association with Access Server 106. Each template is an HTML file that generates and is associated with a particular page or display generated by the system. An administrator may customize the appearance of displays of system 2 by modifying one or more of the templates.

Also preferably, some settings of system 2 are stored in one or more configuration files. Settings of system 2 can be customized by modifying the configuration files and the settings in them. A list of settings that can be customized, and an explanation of their values and the effect upon the system caused by changing them, is set forth in APPENDIX 2.

Security

The system 2 provides authentication and authorization services with several levels of security. The system 2 is based on security features at the network, session and transaction levels.

Network Security

Figure 8:
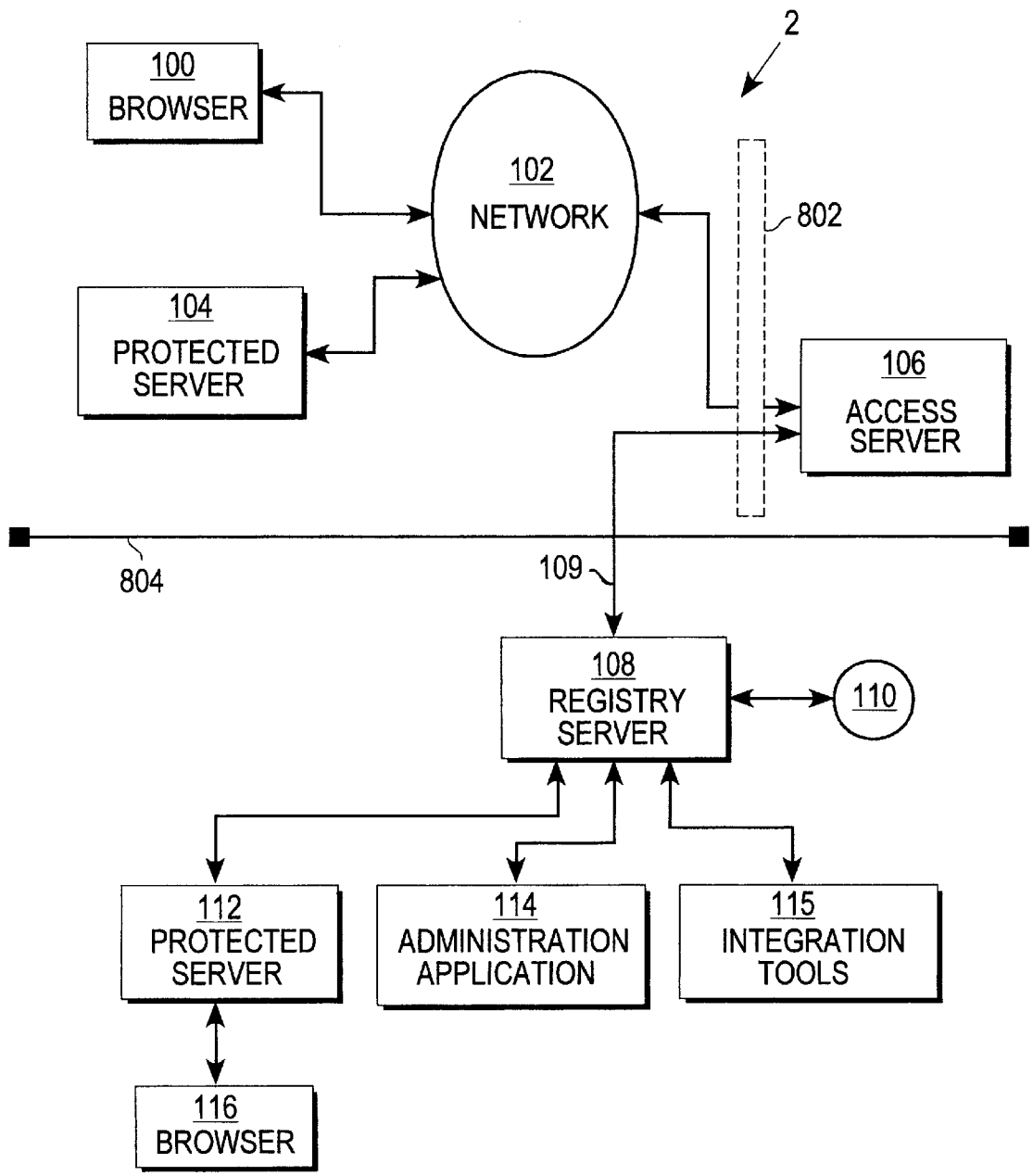
FIG. 8 is a block diagram of the system of FIG. 1 showing security features.

FIG. 8 is a block diagram of the system 2 of FIG. 1 showing preferred security structures and functions. Preferably, system 2 uses one or more firewalls to protect components of the system while providing secure access to users from inside and outside the enterprise. A firewall filters network traffic and controls access to network services. Packets may be filtered based on various criteria, including network protocol, source IP address and destination application.

For example, a soft firewall 802 is logically interposed between network 102, which may be the Internet, and Access Server 106. A hard firewall 804 separates Registry Server 108 from Access Server 106, the network 102, and other elements of the system. A soft firewall is a screening router which blocks certain protocols and prevents IP spoofing. A hard firewall is a router and gateway that blocks all packets, except those between specified applications, for example the Access Server and the Registry Server.

Further, Access Server 106 and Registry Server 108 are coupled by an encrypted link 109. Communications between Access Server 106 and browser 100 over network 102 use encrypted cookies for security.

In this context, the Internet is that part of the network that is considered untrusted. The extranet is the network between the soft and hard firewalls and the Intranet is the most secure part of the network, located behind the hard firewall. A company's public access web server will generally be placed on the Internet. Services accessible to users inside and outside the enterprise, for example protected resources and the Access Server should be placed on the more secure Extranet while internal services and the Registry Server should be secured in the Intranet.

Session Security

All transactions between components in the system are made using HTTP over SSL sessions. For example, browser 100 initiates an SSL session with a handshake during which it negotiates a hash function and session encryption key with HTTP Server 402 of Access Server 106. Once the session is established, all data exchanged between browser 100 and HTTP server 402 is encrypted.

The SSL hash function is used to ensure data integrity, that is, to ensure that transactions are not tampered with or altered in any way. SSL encryption is used to ensure that each transaction is private and confidential. This means that no one can wiretap or eavesdrop and read the contents of transactions. Thus no one can intercept names, passwords and cookies.

Transaction Security

System 2 enforces transaction-level security in several different ways. For example, a user logs into the system by opening a login page and typing in a name and password, in the manner described above in connection with FIG. 5B. As the user types in the password, the system displays a "*" for each character typed so that another person cannot discover the password as it is being typed in. The name and password are sent to the Access Server 106 in an HTTP transaction over an SSL session. Since the session is encrypted, the transaction is private and confidential.

Access Server 106 and Registry Server 108 exchange digital certificates over encrypted link 109. The digital certificates are used during the SSL handshake for mutual authentication. Remote procedure calls from Access Server 106 to Registry Server 108 are then sent over an encrypted HTTP/SSL session.

Access Server 106 asks Registry Server 108 to verify the user's password. Passwords are stored in the Registry Server 108 in an encrypted format. The Registry Server 108 compares passwords and returns the result. If the password is correct, Access Server 106 encrypts data in a User cookie 528 and Roles cookie 530. Cookies are encrypted rather than digitally signed because encryption is faster and produces a smaller cookie, both factors that result in better performance.

Cookies are passed from the Access Server 106 to the browser 100. The browser passes the cookies to every web server that it contacts that is in the same domain as the Access Server 106. Browser 100 discards the cookies when they expire or when the user logs off. Cookies that have not expired when the browser is closed are saved on disk while cookies with an expiration time of 0 are never saved. Cookies are passed to the Protected Server 104 over an encrypted HTTP/SSL session.

If the Runtime Module 206 on a Protected Server 104 can decrypt the cookies successfully, it knows that they must have been created by an Access Server 106 in the same installation. It therefore knows that the request comes from an authenticated user.

To ensure that the cookies are not replayed, the Runtime Module 206 checks that the IP address of the request matches the IP address in the cookie. Thus cookies cannot be intercepted on a user's computer and reused from another computer. The risk of cookies being replayed is further reduced if administrators set the expiration period to 0. In this case, the browser will not save the cookies to disk.

System 2 requires resources to enforce access rights implicit in roles. Resources must take a user's roles into account before returning appropriate information.

System 2 does not assume full cooperation from users, but it cannot protect from user actions like disclosing passwords or leaving workstations untended with authenticated browser sessions open. System 2 seeks to minimize the impact of these actions by automatically expiring passwords and sessions using administrator defined expiration periods.

Reports

In the preferred embodiment, Administration Application 114 can generate reports that list information stored in Registry Repository 110. For example, Administration Application 114 generates a Roles By Resource report that lists roles that are supported by specified resources. Administration Application 114 generates a Users By Resource report that lists users having access to specific resources, and the users' roles. Administration Application 114 generates a Resources By Role report that lists resources assigned to specific roles. Administration Application 114 generates a Users By Role report that lists users assigned to specific roles.

Administration Application 114 generates a Users By Temporary Role report that lists users assigned to temporary roles. Administration Application 114 generates a User Profile report that lists roles and resources associated with specific users. Administration Application 114 generates a User type report that lists all user types and their default roles. Administration Application 114 generates a Functional Group report that lists all functional groups and associated roles.

Preferably, the top-level menu generated by Administration Application 114 has a Reports button. An administrator or other authorized user may access reports by selecting the Reports button. In response, Administration Application 114 displays a list of available reports. The user selects a desired report and then selects a "Run" button. In response, Administration Application 114 generates the selected report. Reports that do not exceed the capacity of browser 100 are displayed as HTML pages at the browser. Longer reports are generated in the form of a text file that can be downloaded.

Log Files

Preferably, system 2 generates a runtime log file and a registry log file that report changes in the configuration of elements of the system, and errors.

The runtime log file is generated by Runtime Module 206 and reports possible errors that occur during initialization of the Runtime Module. The runtime log file also reports possible misuse of cookies, for example, a user attempting to use a cookie file copied or stolen from another user or machine.

The registry log file reports startup parameters of the Authentication Server module 606. The startup parameters include default time zone, whether SSL protocol is enabled, number of threads, etc. The registry log file also reports information about whether the Registry Server 108 started correctly.

Scalability

The system was designed to handle a large number of users accessing a large number of resources, resulting in thousands of login transactions per day and a large number of concurrent transactions. Such scalability is achieved in several ways. For example, there are no logical limits on the number of users or resources. The Registry Repository 110 is implemented using a high-capacity database that can hold a large number of records. The system is optimized for minimal network traffic.

Users only log in once during a authenticated session. No further transactions are required between servers and users or resources. The system has a distributed architecture. Components and protected resources can be installed on a single web server platform as long as it has adequate storage capacity and computing power.

Components may be moved to different servers and replicated on multiple servers to handle an increasing number of concurrent users. Users may login to any Access Server and Domain Name Servers may load balance by returning Access Server address using a round robin scheme. Access Servers in turn may use an alternate Registry Server if a target server does not respond.

Multiple servers increase system performance by reducing login transaction times and increase system reliability by providing redundancy and increased availability. Further, the system is based on an additive data model in which higher levels of user authorization are constructed by incrementally adding privileges and rights to roles that have restrictions on user action. Roles specify which resources a user may access. Assigning a role to a user or deleting a role from a user can add or delete access to all resources with that role. Similarly, adding a role to a resource or removing a role from a resource can give or take away access to that resource from all users with that role. The Administration Application allows administrators to make such changes with a single click, resulting in significant administration time savings.

The system enables administrators to delegate administration. Large-scale systems typically generate constant changes and a decentralized administration model enables faster deployment of changes. For example, Help Desk functions may be delegated to hotline personnel and the implementation of access policies to departmental resources may be delegated to departmental administrators.

Preferred Supporting System Elements

In the preferred embodiment, the browser 100 used by end users may be any Web browser having cookie support. JavaScript support is optional but recommended. Administrators may use any Web browser with support for frames, JavaScript and execution of Java® applets. In the preferred embodiment, end users and administrators may use the Netscape Navigator browser or the Microsoft Internet Explorer browser. In one embodiment, the browser used by end users may have fewer capabilities than the browser used by administrators.

The Protected Web Server, Access Server and Administration Application use the Runtime Module, which runs on web servers with HTTP 1.1 or higher and Web server APIs, such as Netscape's NSAPI or Microsoft's IISAPI. In addition, server components of the system use SSL v2.0 or higher, the Java Virtual Machine and JDBC driver v2.3.2 from WebLogic.

In the preferred embodiment, the server components of the system may be implemented using (1) SunSoft Solaris v2.5 or higher on Sun SPARC servers, and Netscape Enterprise Server v2.0 or higher; (2) Microsoft Windows NT v4.0 or higher on Pentium/Pentium Pro servers and Microsoft Internet Information Server v3.0 or higher; or (3) HP/UX v10.20 or higher with Netscape Enterprise Server v2.0 or higher. In Sun or HP systems, the Registry Repository may be the Oracle7® database server, version 7.3.2 or later, with SQL*NET v2.0, and Microsoft server systems may additionally use MS SQL-Server v6.5 as the Registry Repository.

The system may be developed and implemented using C/C++, Java®, JavaScript, PL/SQL, Microsoft® Visual C++, Symantec® Visual Cafe and Oracle® CASE Designer 2000.

Hardware Overview

Figure 9:
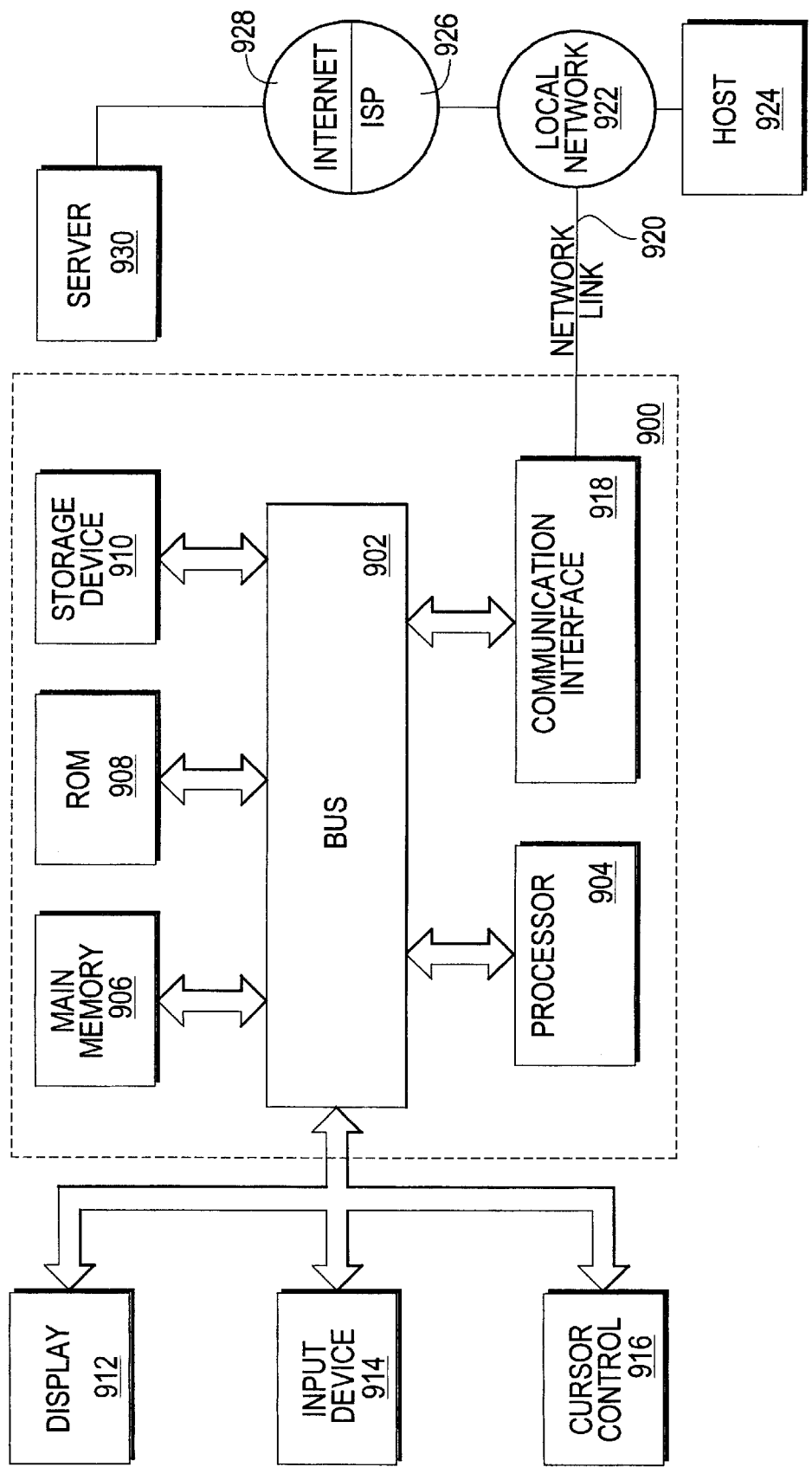
FIG. 9 is a block diagram of a computer system with which aspects of the invention may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for controlling access to protected information resources. According to one embodiment of the invention, controlling access to protected information resources is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for controlling access to protected information resources as described herein.

The received code may be executed by processor 904 as it is received, and/or stored in storage device 910, or other non-volatile storage for later execution. In this manner, computer system 900 may obtain application code in the form of a carrier wave.

Alternatives, Variations, Advantages

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

It will be apparent that the approaches and system described herein has numerous advantages over prior approaches. For example, the system is secure, simple to use, simple to administer, scalable to support a large number of users, easily customized by each installation and easily integrated with web resources. The system assumes that users may use a standard web browser so that they do not have to buy or learn a new application and administrators do not have to maintain an additional application.

The design uses a non-proprietary, standards-based approach that allows customers to buy products and services from any vendor. This approach facilitates the reuse of existing infrastructure components and simplifies the development of new web-enabled resources. The system uses Internet and de facto industry standards for transport and encryption services and focuses on the development of authentication and authorization services. The system was designed as a modular system with well-defined components, services and interfaces. Thus, the system may add new functionality and adopt new technologies quickly, for example, add support for authentication mechanisms like hardware tokens or add support for LDAP directories.

In addition to being modular, the system is open, with a published API. This makes integration with Web resources easy and enables developers to customize the system, for example, to implement custom self-registration policies so that users can setup their own accounts and access resources without administrator intervention.

The system is internationalized to support multiple languages using two-byte character codes. Users may specify a native language, their local time zone and preferred date format. The system will then present information in their preferred language and format.

Security is a fundamental design principle behind the architecture and implementation of this system. The system ensures that users are authentic, that is, they are who they claim to be and that users are authorized, that is, have the right to access a resource. The system ensures end to end security by using firewalls for network level security and SSL with encryption for session level security. The authentication and authorization scheme uses encrypted cookies so that they can be read and written only by system components.

Scalability is another fundamental design principle. The system was designed to handle a large number of users and resources and service a large number of concurrent transactions. No logical limit is placed on the number of users, resources or roles. The only limits are due to processing power and disk space. A distributed architecture allows an organization to increase capacity by installing components of the system on different servers and replicating components on multiple servers.

The system is able to efficiently manage access because it is based on an additive, Roles-based data model. With a single click, administrators can assign a role to a user and give access to all resources with that role. Similarly, adding a role to a resource can give access to all users with that role.

Since large scale systems typically require constant changes, the system implements a delegated administration model so that changes can be made quickly, in a decentralized manner. For example, hotline staff can help users with common requests like forgotten passwords and resource owners can decide who may access their resource.

-63-

APPENDIX 1

ACCESS CONTROL LIBRARY PUBLIC API

64
getAccess™
Integration Guide
Version 2.0
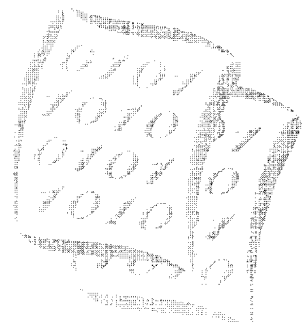
■ enCommerce™
1290 Oakmead Parkway, Suite 301
Sunnyvale, California 94086, USA
Tel(408) 733-7800
Fax(408) 733-7867
info@encommerce.com
http://www.encommerce.com

65

©1997, 1998 enCommerce, Inc. 1290 Oakmead Parkway, Suite 301, Sunnyvale, CA 94086 U.S.A.

All rights reserved. This product or document is protected by copyright and distributed under licenses restricting its use, copying, distribution, and decompilation. No part of this product or document may be reproduced in any form by any means without prior written permission of enCommerce, Inc. and its licensors, if any.

Third-party software—including encryption, SSL protocol implementation, database, and JDBC driver technology in this product—is protected by copyright and licensed software from enCommerce's suppliers.

RESTRICTED RIGHTS LEGEND: Use, duplication, or disclosure by the government is subject to restrictions as set forth in subparagraph (c)(1)(ii) of the Rights in Technical Data and Computer Software clause at DFARS 252.227-7013 and FAR 52.227-19.

The product described in this manual may be protected by one or more U.S. patents, foreign patents, or pending applications.

TRADEMARKS
enCommerce, the enCommerce logo, and getAccess are trademarks or registered trademarks of enCommerce, Inc. in the United States and other countries. Solaris is a trademark of Sun Microsystems, Inc. Windows NT, Microsoft SQL Server, Microsoft, and Excel are trademarks of Microsoft Corporation. Oracle is a trademark of Oracle Corporation. RSA Public Key Cryptosystem, RC4, MD5, and BSAFE are trademarks of RSA Data Security, Inc. jdbcKona is a trademark of WebLogic, Inc. All other product, service, or company names mentioned herein are claimed trademarks and trade names by their respective companies.

THIS PUBLICATION IS PROVIDED "AS IS" WITHOUT WARRANTY OF ANY KIND, EITHER EXPRESS OR IMPLIED, INCLUDING, BUT NOT LIMITED TO THE IMPLIED WARRANTIES OF MERCHANTABILITY, FITNESS FOR A PARTICULAR PURPOSE, OR NON-INFRINGEMENT.

THIS PUBLICATION COULD INCLUDE TECHNICAL INACCURACIES OR TYPOGRAPHICAL ERRORS. CHANGES ARE PERIODICALLY ADDED TO THE INFORMATION HEREIN; THESE CHANGES WILL BE INCORPORATED IN NEW EDITIONS OF THE PUBLICATION. ENCOMMERCE, INC. MAY MAKE IMPROVEMENTS AND/OR CHANGES IN THE PRODUCT(S) AND/OR THE PROGRAM(S) DESCRIBED IN THIS PUBLICATION AT ANY TIME.

ENC-0005-002-E rev. b

March 1998

Contents

Preface ..................................................................................................................... v
Chapter 1 Introduction ......................................................................................... 1
        Development Languages ............................................................................. 1
Chapter 2 Basic Application Integration ............................................................. 3
        Netscape Server ............................................................................................ 3
        Microsoft IIS Server .................................................................................... 3
        Reading Environment Variables in C or C++ ........................................ 3
        Reading Environment Variables in PERL ............................................... 4
        Reading Environment Variables in Java ................................................... 4
            Windows NT ...................................................................................... 4
            UNIX (ksh) ........................................................................................ 4
Chapter 3 Extension Management ...................................................................... 5
        Creating Extensions ..................................................................................... 6
            Internals of class SiteHook ........................................................... 8
            Internals of class HookSigner ..................................................... 11
            Internals of class hook.conf ....................................................... 11
            AuthClient Events ............................................................................ 11
            Exception Handling .......................................................................... 16
        Testing Extensions .................................................................................... 18
            Modifying hook.conf ................................................................. 18
            Modifying hookTester.conf ..................................................... 18
Chapter 4 Customizing getAccess ..................................................................... 19
        Using the User Resource Menu API ....................................................... 19
            Creating a Custom Resource Menu ................................................ 19
            Creating the Wrapper ...................................................................... 20
        Variables ..................................................................................................... 20
        Methods .................................................................................................... 21
        Customizing Your GetAccess Pages ........................................................ 22
            Images ................................................................................................ 23
            HTML Pages ..................................................................................... 23
Chapter 5 Self-Registration ............................................................................... 25
        SelfReg module ................................................................................... 25
            Exceptions ......................................................................................... 26
        Enabling the LDAP Self-Registration Extension ................................... 27
        Enabling the RDBMS Self-Registration Extension ............................... 28
        Modifying Self-Registration Templates ................................................... 29

67

| | |
|---|---|
| Chapter 6 User API | 31 |
| Creating the Wrapper | 31 |
| Variables | 31 |
| Constructors | 31 |
| Methods | 32 |
| Using the user_plus Interface | 33 |
| Appendix A Time Zone and Locale Codes | 35 |
| Appendix B Parameter Specifications for createUser and updateUser | 37 |

Preface

About This Manual

This manual describes how to integrate your applications with getAccess software and customize your system to fit your organization's needs. To use this book, you should be HTML-literate and have experience creating Web-enabled applications in Java and/or C++.

Typographical Conventions

| Typeface | Meaning | Example |
| --- | --- | --- |
| Courier Plain | Text displayed onscreen | C:\getaccess> |
| Courier Oblique | Text displayed onscreen that varies | C:\*filename*.txt |
| Courier Bold | Text you input | C:\>install |
| *Courier Bold Oblique* | Text you input that varies | C:\>*directoryname* |
| *Adobe Garamond Italic* | New terms | ...a *getAccess Role* is... |
| Myriad Semibold | Window, button, or link names | click Save in the Users window |

Note, Important, and WARNING Text

Throughout this manual, you'll see paragraphs set off by ruled lines above and below the text. These paragraphs provide key information of three levels of importance:

- Notes, hints and tips that help you maximize the benefits of getAccess.
- Important information you'll need to keep in mind to achieve the results you need with getAccess.
- WARNING information to help you prevent possible harm to your data or networks.

69

The getAccess Documentation Set

A complete set of manuals accompanies getAccess software from enCommerce, Inc.

- The *getAccess Installation Guide* helps you prepare your Solaris™, Windows NT™, or HP-UX system for getAccess and install getAccess software.
- The *getAccess Design and Administration Guide* helps you structure information in your organization using getAccess concepts, configure your getAccess system to best meet your needs, and administer and manage your working getAccess system.
- The *getAccess Integration Guide* (this guide) helps developers who create or integrate the applications you use with getAccess by providing complete information on how to use the public getAccess API functions, how to extend the standard capabilities of getAccess, and how to implement the self-registration module.

Getting Help

The getAccess Administration application includes an online help system that you can access at any time by clicking Help. You'll find condensed information on how the application's interface works and how to perform basic and advanced functions in the help system.

Technical Support

We offer a variety of technical support programs to help you keep getAccess up and running. Whether you're a direct customer, non-direct customer, or partner, enCommerce technical support services offer you a variety of helpful information.

To learn more about the full range of enCommerce technical-support services, visit our Web site at http://www.encommerce.com/home.html. If you're registered in our support program, you can log in with your user name and password to access our Web-based support services.

getAccess Training

We've designed our training programs to provide you with the knowledge you'll need to get the most from getAccess. Our QuickStart Training Program enables the speediest implementation of getAccess, through two days of onsite installation and systems-administration training. We also offer a Custom Training Program tailored to your organization's needs. For more information, visit http://www.encommerce.com/ and follow the Support link.

7c

Chapter 1

*Introduction* getAccess is an integrated software product that lets you deploy and securely manage the Web-enabled resources you want to provide to your customers, business partners, and employees. Your getAccess software suite includes server-based modules that combine single Web login, authentication, authorization, personalized navigation, profiling, and administration. With getAccess, users have a single point of access to authorized applications and content, and a consistent, familiar Web-based interface. Similarly, first- and second-level administrators have a secure, simple, and powerful system that works with existing intranet and extranet applications, databases, and network architecture.

The getAccess APIs are implemented in Java. There are two public classes: ResourceMenuAPI and enCommUserAPI. . You can use ResourceMenuAPI to customize the getAccess Resource Menu for your users. You can use enCommUserAPI to create applications to integrate into your getAccess system.

Development Languages

If you're developing in Java, you'll find that using the getAccess APIs is a relatively uncomplicated task. If you're developing in C, C++, or other languages, you'll need to use the Java Native Interface (JNI) to interface between your code and the Java Virtual Machine. For information on using the Java Native Interface, see the JNI documentation available from JavaSoft, Inc.

Chapter 2

*Basic Application Integration*

If you're developing a Web application you intend to protect with getAccess and don't need the functionality of the getAccess APIs, your code should read only the following three environment variables. Your application reads the data in these variables to determine user login names, Roles, Role Categories, and each logged-in user's locale.

Note: The getAccess Authentication Server handles the authentication and login access functions. Therefore, you need not include this functionality in your applications.

Netscape Server

- REMOTE_USER contains a user's login name.
- HTTP_ROLE contains the list of Role Category and Role pairs associated with a user in the format <roleCatID.roleID,roleCatID.roleID,...>.
- HTTP_LOCALE contains a user's locale (language and country) information.

Microsoft IIS Server

- HTTP_USER contains a user's login name.
- The HTTP_ROLE and HTTP_LOCALE variables are the same as those for Netscape servers.

See Appendix A on page 35 for a list of locale code values.

Reading Environment Variables in C or C++

```
char *user   = getEnv("REMOTE_USER");
char *role   = getEnv("HTTP_ROLE");
char *locale = getEnv("HTTP_LOCALE");
```

72

Reading Environment Variables in PERL

```
$user = $ENV{"REMOTE_USER"};
$role = $ENV{"HTTP_ROLE"};
$locale = $ENV{"HTTP_LOCALE"};
```

Reading Environment Variables in Java

Java can't read environment variables directly. To read these variables in Java, pass them through one of the following wrappers:

Windows NT

```
java -DREMOTE_USER=%REMOTE_USER% -DHTTP_ROLE=%HTTP_ROLE%
        -DHTTP_LOCALE=%HTTP_LOCALE%
javaProgram
```

UNIX (ksh)

```
java -DREMOTE_USER=$REMOTE_USER -DHTTP_ROLE=$HTTP_ROLE
        -DHTTP_LOCALE=$HTTP_LOCALE
javaProgram
```

Using either of the above wrappers, your Java code might look like this:

```
String user = System.getProperty("REMOTE_USER");
String role = System.getProperty("HTTP_ROLE");
String locale = System.getProperty("HTTP_LOCALE");
```

Chapter 3

*Extension Management*

Your getAccess system lets you create *site extensions*, which are custom code snippets that you create to extend your Access Server's functionality. You tie your extensions to specific Authentication Server events. When those events occur, your code executes.

By using extensions, you can customize the way the getAccess Client behaves when users log in and out, self-register their certificates, and change their profile and password information. You can accomplish such tasks as varying the messages, prompts, and alerts each individual user sees while logging in and out of getAccess or changing profile information. For example, you can set up messages that remind users logging into your getAccess system that their passwords expire in a certain number of days, or prompt them to log into a different server.

To prevent accidental code execution, each extension must be signed by the administrator of the machine where your Access Server is installed. In many cases, you can execute multiple extensions for an event. An "on/off switch" lets the administrator activate and deactivate specific events and extensions, and extensions within the same script can communicate with other extensions serving other events during the login process.

Note: Be sure to copy the serverConnection.conf file from your Authentication Server into the Access Server running your extensions.

74

Creating Extensions

To create and set up extensions to your getAccess system, follow these steps:

1 Inherit from class SiteHook.
2 Implement the action method.
3 Complete and compile your extension.
Your code might look something like this:

```
import java.util.Hashtable;

import enCommerce.getAccess.API.Connection.*;
import enCommerce.getAccess.API.User.*;
import enCommerce.getAccess.API.Hooks.*;

public class onSuccessLoginExtension extends SiteHook
{
    public onSuccessLoginExtension (Hashtable params)
    {
        super (params);
    } public void action () throws Exception
    {
        String username   = (String)get ParamValue("userName");
        String GARoot     = getAccessRoot().trim();
        String configFile = "config/connection.conf";
        Hashtable cookies = new Hashtable();

// if no username is provided, then return
        if(username == null && username.length() < 1)
            return;

// setup the path to get the connection information
        if(GARoot.charAt(GARoot.length() - 1) == '/' ||
           GARoot.charAt(GARoot.length() - 1) == '\\')
            configFile = GARoot + configFile;
        else
            configFile = GARoot + "/" + configFile;
```

75

```
try
    {
            // establish connection to getAccess
            enCommConnection db = new enCommConnection(configFile);

// ready to create a UserAPI instance
            enCommUserAPI userAPI = new enCommUserAPI(db);

// get the person id for the current user and
            // get the user plus information
            String personID = userAPI.getPersonID(username);
            Hashtable ht = userAPI.getUserPlus(personID);

// Getting the information from the user plus table
            String memNum = (String)ht.get("CHAR1");
            String rpin   = (String)ht.get("CHAR2");

// Assign the information to the following cookie names
            cookies.put("MEM_NUM", memNum);
            cookies.put("RPIN", rpin);

// Return the cookies to the caller
            setRetValue("COOKIES", cookies);
    }
    catch(Exception e)
    {
        throw e;
    }
    )
}
```

4 Sign your extension.

For the example above, you'd execute the following command strings:

```
$ java HookSigner ../hooks/onSuccessLoginExtension.class dbpassword
Signature: F+G+WYoGgrA4Lo/rP70WxgjuDXiOVB11
```

5 Tie your extension to a specific event in the *getAccess_root*/config/hook.conf file.
For the example above, you'd set the following values:

```
onSuccessLogin=ON
onSuccessLogin1=ON|onSuccessLoginExtension|F+G+WYoGgrA4Lo/
rP70WxgjuDXiOVB11
...
```

Internals of class SiteHook

SiteHook is an abstract class from which you inherit when you create extensions. This class contains a finite number of parameters that are passed to the extension according to the event(s) that the extension handles.

All your user-defined extensions must call the parent class in the constructor and implement the action method. To get parameters that the caller (a getAccess module) passes, your extensions must call getParamValue with the desired parameter name .

Design your extensions so that errors occurring during execution throw exceptions with an appropriate description of the problem. When multiple extensions execute for an event and an exception is caught, the extension that caused the exception and consecutive extensions don't execute, making the caller react to the exception.

An extension can return predefined values to the caller. Depending on the event that the extension is tied to, a variety of return values can be expected. Currently, getAccess extensions can return the following keys, which all contain hashtables of name-value pairs:

- COOKIES
- SECURE_COOKIES
- SPECIALIZED_FIELDS
- HOOKCOMM

When creating your extensions, you can set these return values by calling the setRetValue method, which receives the key name and the string or hashtable it contains. To remove return values added by mistake, call the removeRetValue method, which receives the key name and return value to eliminate. Design your extensions so that after the caller returns from the extension, it calls the getRetValue method, which returns the complete hashtable. The caller can then process the return values it's intended to handle.

When one of multiple extensions you tie to a single event fails, processing reverts to the default getAccess execution. Extensions that follow the failed extension for that particular event do not execute or return values to the caller. Action within getAccess continues as if no extensions were attached to the particular event.

COOKIES

This Java hashtable contains name-value pairs of information to be stored in the user's browser. Here's a sample:

| Name (Hashtable Key) | Value (Hashtable Value) |
|---|---|
| SSN | 123456789 |
| SECRET_PHRASE | Hello world!!! |
| COMPANY | enCommerce, Inc. |
| ACCOUNT_ID | 8575 |

The Access Server sends each key's name-value pairs to the user's browser as a cookie. All Resources can then get these extra cookies from the HTTP_COOKIE environment variable.

SECURE_COOKIES

This Java hashtable also contains name-value pairs of information that the Access Server sends to the user's browser as cookies. However, these cookies are more secure because they're encrypted and because only specified Resources can access them. Only the onSuccessLogin event returns SECURE_COOKIES. The extension returns a hashtable that contains keys named by Resource IDs. The key values are name-value pairs separated by commas. Here's a sample:

| Resource ID (Hashtable Key) | Name-Value Pair (Hashtable Value) |
|---|---|
| resid1 | SSN=123563785,COLOR=red |
| resid2 | FOOD=pasta,FRUIT=banana |
| scglobal | LANGUAGE=english |

The key names correspond to the Resource IDs entered in the Administration application during Resource creation. The scglobal Resource ID adds its name-value pairs to all Resources. Commas separate the name-value pairs, and the name should be in uppercase to avoid conflicts with environment-variable names in the UNIX environment. Paired names and values should not contain any commas, semicolons, or equal symbols (=).

The Runtime decrypts secure cookies and looks for a match between their component Resource IDs and the Resources that users want to access. When the Runtime finds a match, it loads the name-value pairs for that Resource ID into HTTP_SC environment variables. Here's a sample showing how this would work for the resid1 key from the table above:

HTTP_SC_SSN=123563785
HTTP_SC_COLOR=red
HTTP_SC_LANGUAGE=english

The first two environment variables contain the name-value pairs from the Resource ID. The third variable contains the name-value pair from the scglobal key. Every scglobal name-value pair is set to every Resource.

SPECIALIZED_FIELDS

This Java hashtable contains specific fields that each particular event expects. Here are the keys and values:

| Name (Hashtable Key) | Value (Hashtable Value) | Example |
| --- | --- | --- |
| GETACCESSUSERNAME | Existing getAccess username | websecadm |
| MESSAGE | Specific message | Password expires in 1 day |
| URL | URL string | http://ourcompany.com |
| SKIPGETACCESSADDCERT | String, value true or false | |
| SKIPGETACCESSAUTH | String, value true or false | |
| SKIPGETACCESSDELETECERT | String, value true or false | |
| SKIPGETACCESSPASSWORD | String, value true or false | |
| SKIPGETACCESSPROFILING | String, value true or false | |

HOOKCOMM

This Java hashtable contains information that extensions tied to different events can share. Here's an example:

```
import java.util.Hashtable;
import enCommerce.getAccess.API.Hooks.*;
public class HookCommExtension extends SiteHook
{
    public HookCommExtension(Hashtable params)
    {
        super(params);
    } public void action() throws Exception
    {
        Hashtable hookComm    = (Hashtable)getParamValue("hookComm");
        hookComm.put("info", "Hello World!!!");
        setRetValue("HOOKCOMM", hookComm);
    }
}
```

Internals of class `HookSigner`

The class `HookSigner` lets you sign your extensions. Signing gives an administrator control over the extensions getAccess executes. Any extension tied to an event must be signed for getAccess to trust the extension. Unsigned extensions do not execute; this safeguards against the implementation of unauthorized or malicious extensions.

Internals of class `hook.conf`

After you generate the signature for your extension, you tie it to the event you want to use to trigger extension execution. You establish this linkage in the hook.conf configuration file located in *getAccess_root*/config. The syntax of the hook.conf file is:

```
eventName=ON
eventName1=ON|className|signature
eventName2=OFF|className|signature
eventName3=ON|className|signature eventName=OFF
...
```

Use an event's name with the ON or OFF parameters to specify whether you want it handled by extensions. To tie an extension to an event, add its class name and signature after the ON parameter, using the vertical-bar character (|) as a separator. When you're tying multiple extensions to a single event, use a positive number to indicate their execution order.

AuthClient Events

In the following descriptions, an (M) after an event's name means you can tie more than one extension to it.

- Event: `onBeforeVerify` (M)
  Default Behavior: Occurs when the getAccess login screen displays.
  Parameters: userName, userHost, userBrowser, referPage, serverURL, hookComm, loginPolicy, userLocale
  Returns: HOOKCOMM (optional)
  Example Usage: Tie an extension to this event to initialize code, read or write files, or connect to another system.

- Event: `onVerifyLogin`
  Default Behavior: Occurs when a user clicks Login after entering a username and password. Triggers the authentication process.
  Parameters: userName, userHost, userBrowser, formData, referPage, serverURL, hookComm, loginPolicy, userLocale, userPassword, userCert, verifyPolicy

Returns: SPECIALIZED_FIELDS: SKIPGETACCESSAUTH, GETACCESSUSERNAME, HOOKCOMM (optional)

Example Usage: Tie an extension to this event to override the default authentication process and use information from another server to verify a user's privileges. The user must have getAccess Roles defined on the alternate server for authentication to succeed.

- Event: onFailLogin (M)

Default Behavior: Occurs when there's no match for a user's login and password in the Authentication Server database. Triggers recording of the date, time, and host server of the user's unsuccessful login attempt and storage of the information in a cookie.

Parameters: userName, userHost, userBrowser, referPage, serverURL, hookComm, loginPolicy, userLocale

Returns: COOKIES, HOOKCOMM (optional)

Example Usage: Tie an extension to this event to send a cookie to the user's browser that displays an alert message, or to write a message describing the failure and automatically e-mail it to a specified individual.

- Event: onShowFailLogin

Default Behavior: Occurs when an error screen displays after a user attempts to log in unsuccessfully.

Parameters: userName, userHost, userBrowser, referPage, serverURL, hookComm, loginPolicy, userLocale

Returns: SPECIALIZED_FIELDS: URL, HOOKCOMM (optional)

Example Usage: Tie an extension to this event to redirect a user to another URL after an unsuccessful login attempt, either to allow login to a different server or to report a forgotten password.

- Event: onSuccessLogin (M)

Default Behavior: Occurs when a user logs in successfully. Triggers recording of the date, time, and host server of the user's successful login and storage of the information in a cookie.

Parameters: userName, userHost, userBrowser, referPage, serverURL, hookComm, loginPolicy, userLocale, attemptsInfo

Returns: COOKIES, SPECIALIZED_FIELDS: MESSAGE, SECURE_COOKIES, HOOKCOMM (optional)

Example Usage: Tie an extension to this event to record a custom message in the cookie, for instance, adding a password-expiration or stock-purchase plan message to a user's previous login data.

- Event: onShowSuccessLogin

Default Behavior: Occurs when a user logs in successfully. Triggers display of a screen showing data on the date, time, and host of the user's last successful and unsuccessful logins.

Parameters: userName, userHost, userBrowser, referPage, serverURL, hookComm, loginPolicy, userLocale, attemptsInfo

*81*

Returns: SPECIALIZED_FIELDS: URL, HOOKCOMM (optional)

Example Usage: Tie an extension to this event to redirect a user to another URL after a successful login attempt.

◆ Event: onLogout (M)

Default Behavior: Occurs when a user logs out. Triggers display of a screen showing a logout message, with login and password fields to let the user log in again.

Parameters: userName, userHost, userBrowser, referPage, serverURL, hookComm, userLocale

Returns: COOKIES, HOOKCOMM (optional)

Example Usage: Tie an extension to this event to destroy a cookie when a user logs out, or to send a custom message to the user.

◆ Event: onAddCertificate

Default Behavior: Occurs when a user self-registers a digital certificate. Triggers addition of the certificate to the Registry Repository.

Parameters: userName, userHost, userBrowser, referPage, serverURL, hookComm, loginPolicy, userLocale, userPassword, userCert, verifyPolicy

Returns: SPECIALIZED_FIELDS: SKIPGETACCESSADDCERT, HOOKCOMM (optional)

Example Usage: Tie this event to an extension to store the digital certificate in a Registry Repository on an alternate server.

◆ Event: onBeforeChangeProfile (M)

Default Behavior: Occurs when a user clicks Change Profile in the getAccess Client.

Parameters: userName, userHost, userBrowser, referPage, serverURL, hookComm, userLocale

Returns: HOOKCOMM (optional)

Example Usage: Tie this event to an extension to initialize code, connect to an external database, or open files.

◆ Event: onChangeProfile

Default Behavior: Occurs when a user updates his or her profile. Triggers updating of the user profile information in the Registry Repository.

Parameters: userName, userHost, userBrowser, referPage, serverURL, hookComm, loginPolicy, userLocale, userTimeZone, userDateCode, userNewPassword (if any)

Returns: SPECIALIZED_FIELDS: SKIPGETACCESSPROFILING, HOOKCOMM (optional)

Example Usage: Tie this event to an extension to update profile information stored on alternate servers, or to add custom fields such as name and address data. For more information, see Chapter 4 on page 19.

◆ Event: `onFailChangeProfile` (M)
  Default Behavior: Occurs when a user unsuccessfully attempts to change his or her profile. Triggers recording of the date, time, and host server of the user's unsuccessful attempt and storage of the information in a cookie.
  Parameters: `userName, userHost, userBrowser, referPage, serverURL, hookComm, userLocale`
  Returns: `COOKIES, HOOKCOMM` (optional)
  Example Usage: Tie this event to an extension to send a cookie to the browser that displays a custom error message.

◆ Event: `onShowFailChangeProfile`
  Default Behavior: Occurs when a screen showing an error message displays after a user unsuccessfully attempts to change his or her profile.
  Parameters: `userName, userHost, userBrowser, referPage, serverURL, hookComm, userLocale`
  Returns: `URL, HOOKCOMM` (optional)
  Example Usage: Tie this event to an extension to redirect the user to a different URL before or after the error-message screen displays.

◆ Event: `onSuccessChangeProfile` (M)
  Default Behavior: Occurs when a user successfully changes his or her profile. Triggers recording of the date, time, and host server of the user's successful update and storage of the information in a cookie.
  Parameters: `userName, userHost, userBrowser, referPage, serverURL, hookComm, userLocale`
  Returns: `COOKIES, HOOKCOMM` (optional)
  Example Usage: Tie this event to an extension to send a cookie to the browser that displays a custom update-confirmation message.

◆ Event: `onShowSuccessChangeProfile`
  Default Behavior: Occurs when a screen showing an update-confirmation message appears after a user successfully changes his or her profile.
  Parameters: `userName, userHost, userBrowser, referPage, serverURL, hookComm, userLocale`
  Returns: `SPECIALIZED_FIELDS: URL, HOOKCOMM` (optional)
  Example Usage: Tie this event to an extension to redirect the user to another URL that displays a custom message.

◆ Event: `onBeforeChangePassword` (M)
  Default Behavior: Occurs when a user clicks Change Profile in the getAccess Client.
  Parameters: `userName, userHost, userBrowser, referPage, serverURL, hookComm, userLocale`

*ʃ3*

Returns: HOOKCOMM (optional)

Example Usage: Tie this event to an extension to initialize code, connect to an external database, or open files.

- Event: onChangePassword
  Default Behavior: Occurs when a user updates his or her profile. Triggers updating of the user profile information in the Registry Repository.
  Parameters: userName, userHost, userBrowser, referPage, serverURL, hookComm, formData, loginPolicy, userLocale, userTimeZone, userDateCode, userNewPassword(if any)
  Returns: SPECIALIZED_FIELDS: SKIPGETACCESSPASSWORD, GETACCESSUSERNAME, HOOKCOMM (optional)
  Example Usage: Tie this event to an extension to update profile information stored on alternate servers, or to add custom fields such as name and address data. For more information, see Chapter 4 on page 19.

- Event: onFailChangePassword (M)
  Default Behavior: Occurs when a user unsuccessfully attempts to change his or her profile. Triggers recording of the date, time, and host server of the user's unsuccessful attempt and storage of the information in a cookie.
  Parameters: userName, userHost, userBrowser, referPage, serverURL, hookComm, userLocale
  Returns: COOKIES, HOOKCOMM (optional)
  Example Usage: Tie this event to an extension to send a cookie to the browser that displays a custom error message.

- Event: onShowFailChangePassword
  Default Behavior: Occurs when a screen showing an error message displays after a user unsuccessfully attempts to change his or her profile.
  Parameters: userName, userHost, userBrowser, referPage, serverURL, hookComm, userLocale
  Returns: URL, HOOKCOMM (optional)
  Example Usage: Tie this event to an extension to redirect the user to a different URL before or after the error-message screen displays.

- Event: onSuccessChangePassword (M)
  Default Behavior: Occurs when a user successfully changes his or her profile. Triggers recording of the date, time, and host server of the user's successful update and storage of the information in a cookie.
  Parameters: userName, userHost, userBrowser, referPage, serverURL, hookComm, userLocale
  Returns: COOKIES, HOOKCOMM (optional)
  Example Usage: Tie this event to an extension to send a cookie to the browser that displays a custom update-confirmation message.

84

- Event: onShowSuccessChangePassword
  Default Behavior: Occurs when a screen showing an update-confirmation message appears after a user successfully changes his or her profile.
  Parameters: userName, userHost, userBrowser, referPage, serverURL, hookComm, userLocale
  Returns: SPECIALIZED_FIELDS: URL, HOOKCOMM (optional)
  Example Usage: Tie this event to an extension to redirect the user to another URL that displays a custom message.

- Event: onAddCertificateMgmt
  Default Behavior: Occurs when an administrator registers a user's digital certificate.
  Parameters: userName, userHost, userBrowser, referPage, serverURL, userLocale, userCert
  Returns: SPECIALIZED_FIELDS: SKIPGETACCESSADDCERT, HOOKCOMM (optional)
  Example Usage: Tie this event to an extension to add newly-registered digital certificates to an alternate Registry Repository on a different server. (To accomplish this particular task, you must override the onVerifyLogin event.)

- Event: onDeleteCertificateMgmt
  Default Behavior: Occurs when an administrator deletes a user's digital certificate.
  Parameters: userName, userHost, userBrowser, referPage, serverURL, hookComm, userLocale, certSerial
  Returns: SPECIALIZED_FIELDS: SKIPGETACCESSDELETECERT, HOOKCOMM (optional)
  Example Usage: Tie this even to an extension to delete digital certificates from an alternate Registry Repository on a different server. (To accomplish this particular task, you must override the onVerifyLogin event.)

Exception Handling

Design your extensions to throw exceptions when both explainable and unidentifiable errors occur. The exceptions trigger the display of the following error messages to the user:

- Event: onVerifyLogin

InvalidUserException = The user and password are not valid.

InactiveAccountException = The user is inactive.

PasswordExpiredException = The user's password has expired.

CANotTrustedException = The CA is not a trusted CA.

InvalidParameterException = The user does not exist in the system.

Exception = Something unexplainable happened in the extension. Proceed with getAccess execution.

OtherException = Stops getAccess execution and displays a system error.

*85*

- ◆ Event: onAddCertificate

CANotTrustedException = The CA is not a trusted CA.

Exception = Something unexplainable happened in the extension. Proceed with getAccess execution.

OtherException = Stops getAccess execution and displays a system error.

- ◆ Event: onChangeProfile

InvalidUserException = The user and password are not valid.

InvalidParameterException = The user does not exist in the system.

InactiveAccountException = The user is inactive.

PasswordExpiredException = The user's password has expired.

Exception = Something unexplainable happened in the extension. Proceed with getAccess execution.

OtherException = Stops getAccess execution and displays a system error.

- ◆ Event: onChangePassword

InvalidUserException = The user and password are not valid.

InvalidParameterException = The user does not exist in the system.

InactiveAccountException = The user is inactive.

Exception = Something unexplainable happened in the extension. Proceed with getAccess execution.

OtherException = Stops getAccess execution and displays a system error.

- ◆ Event: onAddCertificateMgmt

PrimaryKeyException = Certificate already exists.

DuplicatedRowsException = Duplicate data already exist.

Exception = Something unexplainable happened in the extension. Proceed with getAccess execution OtherException = Stops getAccess execution and displays a system error.

- ◆ Event: All Events

OtherException = Stops getAccess execution and displays a system error.

Testing Extensions

After you create an extension, you can test it with the HookTester program located in *getAccess_root*/bin. After you've created and signed your extension, modify the hook.conf file located in *getAccess_root*/config/ to handle your extension's events, then modify the hookTester.conf file in the same directory to pass parameters to your extension.

Modifying hook.conf

The hook.conf file contains all getAccess-supported events. You can add a fictitious event to test your extension. You can also use any of the events already defined in the hook.conf file. Here's a sample entry:

```
OnTest=ON
OnTest1=ON|newExtension| newExtension Signature
```

Modifying hookTester.conf

The hookTester.conf file contains the parameters that are passed to your extension during extension testing. Most getAccess-supported events pass parameters to your extension(s). The HookTester program simulates the normal sequence of calls from getAccess. Here's a sample entry:

```
userName=websecadm
userLocale=en_US
```

To test your extension, place it in the *getAccess_root*/hook directory , change to the *getAccess_root*//bin directory, and execute the following command line:

```
java HookTester onTest
```

After the HookTester program completes the testing process, it displays a status message indicating whether extension execution succeeded.

Chapter 4

*Customizing getAccess*

You can tailor your getAccess system to meet your organization's needs in many ways. This chapter explains how to use the getAccess User Resource Menu API to customize the getAccess Resource Menu, and how to add your company's distinctive look and feel to the HTML templates the Access Server uses to display getAccess pages.

Using the User Resource Menu API

The getAccess API is implemented in Java. The UserResourceMenu class builds each user's getAccess Resource Menu based on his or her user profile. You can use this API to create a custom getAccess Resource Menu for your organization.

Creating a Custom Resource Menu

1. Create a class that extends the UserResourceMenu class.
2. In main, instantiate the class.
3. In main, invoke init. This establishes a connection to the database and reads the appropriate configuration files.
4. In main, invoke the readConfigFile method to obtain the URLs for ChangePassword and Logout. This step is optional. Normally these URLs default to standard values.
5. In main, construct a hashtable of template substitutions. See the description of the display method in the javadoc for more information about constructing the hashtable and template.
6. In main, invoke the display method.
7. Create the HTML template for your getAccess Resource Menu. See "Customizing Your GetAccess Pages" on page 22 for more information about creating and modifying customized templates.

*88*

8 Create the wrapper for your class. For information about creating the wrapper, see "Creating the Wrapper" on page 20.

9 Modify the reslist entry in redirection.conf to point to your new getAccess Resource Menu.

Creating the Wrapper

To be sure your new Resource Menu class functions correctly, do the following:

- Set the LD_LIBRARY_PATH (in UNIX) or the PATH environment variable (in Windows NT) to point to the getAccess/shared directory.
- Set the CLASSPATH variable to point to the getAccess/bin/java/lib directory.
- In your wrapper code, define your system properties as follows:

| Property | Environment Variable or Path |
|---|---|
| java.home | *getAccess_root*/bin/java |
| HTTP_USESSL | HTTP_USESSL |
| cgi.content_type | CONTENT_TYPE |
| cgi.content_length | CONTENT_LENGTH |
| cgi.cgi.remote_user | REMOTE_USER |
| cgi.remote_addr | REMOTE_ADDR |
| cgi.request_method | REQUEST_METHOD |
| cgi.server_name | SERVER_NAME |
| cgi.server_port | SERVER_PORT |
| cgi.query_string | "QUERY_STRING" |
| cgi.http_locale | HTTP_LOCALE |

Variables

For more information on variable syntax and usage, refer to the javadoc.

| Variable | Purpose |
|---|---|
| rootPath | Contains the location of the getAccess root directory. |
| userLogin | Contains the user's login name. Available only after init is called. |
| firstName | Contains the user's first name. Available only after init is called. |
| lastName | Contains the user's last name. Available only after init is called. |

| Variable | Purpose |
|---|---|
| httpLocale | Contains the current user's locale. Available only after init is called. |
| formData | Contains form data. Available only after init is called. |
| resourceToDisplay | Contains the maximum number of Resources to display onscreen before converting the list to a combo box. |
| userResources | Contains an array of Resources available to the user. This is a two-dimensional array in which rows correspond to Resources, and columns contain Resource ID, URL, Name, and default button image URL. Available only after init is called. |

Methods

For more information on usage and syntax, parameters, returned values, and exceptions thrown, refer to the javadoc.

◆ Method: readConfigFile
Description: Reads an optional applist.conf configuration file, located in the getAccess_root/config directory. If the file or any of its entries are missing, getAccess uses default values.
Suggested Use: You can specify alternate HTML templates, text display options, and URLs you want getAccess to use for the getAccess Resource Menu; the login and logoff pages; and the Change Profile screen.

◆ Method: getDefaultButtons
Description: Constructs a string of HTML tags that implement a list of clickable buttons. Each graphical button is linked to a Resource available to users.
Suggested Use: You can specify custom graphical buttons to appear next to each of your applications in the getAccess Resource Menu.

◆ Method: init
Description: Initializes class members, parses form data, and sets up database and API connectivity. This method first reads the HTTP_COOKIE environment variable to determine the current user, then connects to the registry database.
Suggested Use: This method is an essential building block of its class and is required to make the majority of variables available.

◆ Method: getResourceRoles
Description: Gets Resource Roles for a given Resource ID in the system in an array format sorted by Role Names.
Suggested Use: You can apply filtering or add or delete user privileges.

♦ Method: `display`

Description: Displays the `UserResourceMenu` template. This template should contain tokens that start with a leading $, which correspond to keys in the method's parameters. Display will substitute the tokens with the corresponding value from params.

Suggested Use: You can use this method to display a customized getAccess Resource Menu that reflects your organization's own distinctive look and feel.

♦ Method: `resetRoleCookie`

Description: Gets the user's available Roles (in encrypted form) from the database and stores them in the Role cookie. This method only changes the Role cookie(s); call it immediately before displaying content after the `authAPI` has been initialized.

Suggested Use: You can use this method to update a user's Role assignments to reflect changes, additions, or deletions.

Customizing Your GetAccess Pages

The getAccess user interface is largely based on HTML, which means you can easily modify the screens to incorporate your organization's look and feel. You can use any text editor or HTML authoring tool to edit the end-user Web pages provided with your getAccess system installation. When you modify getAccess HTML pages, follow these guidelines:

- Replace images like splash screens, buttons, headers, and footers with your own graphics.
- Leverage the existing artwork by replacing static text (such as instructions, field labels, etc.) with your own text.

▲ Important: When you're editing getAccess HTML pages, don't change any strings that begin with dollar signs ($) or are enclosed in @ signs. Because getAccess uses these strings to do some of its work, changing them will result in system problems. You can, however, change their location on a page.

All the customizable HTML templates are in the `/getAccess_templates` directory on the getAccess distribution CD-ROM. You can also customize the end-user online help; the files are in the `/getAccess_templates/help` directory on the getAccess CD-ROM.

Following is a list of customizable getAccess files. All listed subdirectories appear within your getAccess installation's root directory.

*9/*

Images

| Filename | Purpose |
| --- | --- |
| /images/changepassword_banner.gif | Banner graphic in Change Password screen |
| /images/changeprofile_banner.gif | Banner graphic in Change Profile screen |
| /images/loginbanner.gif | Banner graphics in Login Screen |
| /images/resmenu_banner.gif | Banner graphic on getAccess Resource Menu |
| /images/Auth/en_US/changeprofile_bt.gif | Banner graphic on Change Profile screen |
| /images/Auth/en_US/help_bt.gif | Help button graphic |
| /images/Auth/en_US/logout_bt.gif | Logout button graphic |
| /images/Auth/en_US/gobutton.gif | Go button graphic |
| /images/buttons/default.jpg | Default Resource button |
| /images/buttons.sekapp.jpg | Administration Application button on getAccess Resource Menu |

HTML Pages

| Filename | Purpose |
| --- | --- |
| /docs/index.html | getAccess login screen for Netscape Enterprise Server |
| /docs/Default.htm | getAccess login screen for Microsoft Internet Information Server |
| /docs/restricted.html | Restricted page error-message screen |
| /templates/Auth/Locale/accountInactive.html | Account Inactive error-message screen |
| /templates/Auth/Locale/addCert.html | Add Certificate screen |
| /templates/Auth/Locale/AppMenu.html | getAccess Resource Menu screen |
| /templates/Auth/Locale/certMenu.html | Certificate Management menu |

*9-2*

| Filename | Purpose |
| --- | --- |
| /templates/Auth/Locale/certMgmt.html | Manage Certificate screen |
| /templates/Auth/Locale/change_prof.html | Change Profile screen |
| /templates/Auth/Locale/change_pw.html | Change Password screen |
| /templates/Auth/Locale/feedback.html | Feedback message screen |
| /templates/Auth/Locale/login.html | getAccess login screen with dynamic fields |
| /templates/Auth/Locale/logout.html | getAccess logout-message screen |
| /templates/Auth/Locale/passwordExpired.html | Password expired error-message screen |
| /templates/Auth/Locale/Warning.html | Warning-message screen |
| /templates/Auth/Locale/Welcome.html | Welcome screen |
| /templates/Auth/Locale/wrongLogin.html | Wrong login error-message screen |

Chapter 5

*Self-Registration*

Your initial getAccess installation includes a self-registration module provided in the form of sample code. Two implementations are currently used: LDAP and normal RDBMS. LDAP self-registration connects to Netscape Directory Server 3.0 and authenticates users based on user login and password input. RDBMS self-registration works the same way, but validates the user based on information stored in an Oracle database instead of an LDAP server. Both the LDAP and the RDBMS modules are getAccess extensions.

SelfReg module

The SelfReg module validates users and creates accounts in the getAccess Registry. Authentication occurs during extension execution. The location of your validation data determines whether you can use the LDAP self-registration extension or the RDBMS self-registration extension.

The onSelfReg event triggers execution of the SelfReg module. The input parameters passed to the extension are verifyinfo and accountinfo. The output parameters passed from the extension are SPECIALIZED FIELDS: lastname, firstname, usrlogin, password, persontypecode, createdby, personidentifier, email, accountexpiredate, middleInitial, and passwordExpireInterval.

Regardless of whether you create a custom extension to authenticate users or use the sample source code provided with getAccess, you follow the same procedure described in "Creating Extensions" on page 6—you compile and sign your extension, then add it to the hook.conf file.

94

The input parameters `verifyinfo` and `accountinfo` are Java hashtables that contain the field data from the form on the getAccess self-registration screen. For more information on modifying the HTML templates related to this function, see "Modifying Self-Registration Templates" on page 29.

The extension returns a `SPECIALIZED_FIELDS` hashtable that contains the following parameters:

| Required Fields | | Optional Fields | |
|---|---|---|---|
| Type | Parameter | Type | Parameter |
| String | lastname | String | email |
| String | firstname | java.sql.Date | accountexpiredate |
| String | usrlogin | String | middleInitial |
| String | password | Integer | passwordExpireInterval |
| String | persontypecode | | |
| String | createdby | | |
| String | personidentifier | | |

Exceptions

- enCommerce.getAccess.API.Hooks.AuthenticationException: Failed to authenticate in the Directory Server.
- enCommerce.getAccess.API.Hooks.ConfigFileException: Failded to read ldap.conf.
- enCommerce.getAccess.API.Hooks.ConnectionException: Failed to connect to data source.
- enCommerce.getAccess.API.Hooks.MappingException: Failed to get required data from Directory Server (NULL).
- enCommerce.getAccess.API.Hooks.VerificationException: Failed to verify user.
- enCommerce.getAccess.API.Hooks.GetDataException: Failed to get account information.

95

Enabling the LDAP Self-Registration Extension

The LDAP extension is called by the SelfReg module to verify the information that users enter and to collect the necessary information to create getAccess accounts. The sample source code provided as part of your getAccess installation works with Netscape Directory Server 3.0.

1  Install getAccess and add a Self-Registration hyperlink to the login page. For more information about modifying HTML templates, see "Customizing Your GetAccess Pages" on page 22.

2  Check that the machine(s) where the Self-Registration module is installed have JDK 1.1.3 or higher.

3  Modify the PATH environment variable so that it includes the path to the JDK binary files.

4  Add the following path to the CLASSPATH environment variable:

getAccess_root\bin\java\lib;getAccess_root\bin

5  Edit the ldap.conf file.

Modify the LDAP connection parameters to reflect your LDAP server's host name, port and search base. Specify any authentication info that your LDAP server requires.

6  Sign the hook. For more information on signing, see "Creating Extensions" on page 6.

7  Edit getAccess_root\hooks\hook.conf.

In the Self-Registration section, enable the hook by first changing onSelfReg=OFF to onSelfReg=ON, and then adding an entry immediately below, as follows:

onSelfReg1=ON|LDAPSSelfRegHook|signature

Use the value you obtained when you signed the hook instead of signature. Make sure to remove the signature label and any leading or trailing spaces after you add the information to hook.conf. The signature must appear in one line with a carriage return at the end.

8  Test the Self-Registration module. If you use the default value provided by getAccess, enter Jensen as the last name and bjensen@aceindustry.com as the email address.

Enabling the RDBMS Self-Registration Extension

The RDBMS extension is called by the SelfReg module to verify the information that users enter and to collect the necessary information to create getAccess accounts. The sample source code provided as part of your getAccess installation works with Oracle. This extension verifies user information against the EMPLOYEE table in the getAccess Registry.

1  Install getAccess and add a Self-Registration hyperlink to the login page. For more information about modifying HTML templates, see "Customizing Your GetAccess Pages" on page 22.

2  Check that the machine(s) where the Self-Registration module is installed have JDK 1.1.3 or higher.

3  Modify the PATH environment variable so that it includes the path to the JDK binary files.

4  Add the following path to the CLASSPATH environment variable:

*getAccess_root*\bin\java\lib;*getAccess_root*\bin

5  Edit *getAccess_root*\Hooks\RDBMSSelfRegHook.java.

In the //Database connection info section, change the database connection variables as follows:

- Edit dbUser to reflect the username included in the verification information.
   - Edit dbPassword to reflect the Oracle password.
   - Edit dbServer's TWO_TASKS value to reflect the database's location.

6  Compile RDBMSSelfRegHook.java and sign the hook. For more information on signing, see "Creating Extensions" on page 6.

In the Self-Registration section, enable the hook by first changing onSelfReg=OFF to onSelfReg=ON, and then adding an entry immediately below, as follows:

onSelfReg1=ON|RDBMSSSelfRegHook|*signature*

Use the value you obtained when you signed the hook instead of *signature*. Make sure to remove the signature label and any leading or trailing spaces after you add the information to hook.conf. The signature must appear in one line with a carriage return at the end.

7  Test the Self-Registration module. If you use the default value provided by getAccess, enter Jensen as the last name and bjensen@aceindustry.com as the email address.

97

Modifying Self-Registration Templates

The HTML template and translation files for the Self-Registration module are located in *getAccess_root*/templates/Self-Reg/en_US.

The HTML template 's Verification Information panel contains fields for a user's last name and e-mail address; getAccess uses this data to verify the user. The field names for this panel are in the format verify_fieldname, where verify is the panel's name and fieldname is the actual field name sent to the extension.

The Account Information panel contains fields used to create the account in the getAccess Registry. The field names for this panel are in the format accountinfo_fieldname, where accountinfo is the section name and fieldname is the actual fieldname sent to the extension.

If you customize this template, you must modify the SelfReg module to accommodate the field names and template handling.

Chapter 6

*User API*

The getAccess Access Client Library API is implemented in Java. There are two public classes: UserResourceMenu and enCommUserAPI. This chapter documents enCommUserAPI. enCommUserAPI executes user-related processes handled by an Authentication Server module. You can use this API to enhance your own applications by leveraging the information stored in the Registry Repository.

The parameter specifications for the enCommUserAPI are listed in Appendix B on page 37.

Creating the Wrapper

Before calling any of the methods in enCommUserAPI, be sure to create an instance of enCommConnection.

Variables

The rootPath variable contains the location of the getAccess root directory. For more information on variable syntax and usage, refer to the javadoc.

Constructors

For descriptions and information on usage and syntax, refer to the javadoc.

99

Methods

For more information on usage and syntax, parameters, returned values, and exceptions thrown, refer to the javadoc.

◆ Method: findUser
Description: Finds a list of users from the repository. This function returns a two-dimensional array containing each user's first name, last name, Person Type, login name, and Person ID. This function returns up to the maxfetchrecords in the configuration file read by enCommConnection. This function returns null if an error occurs or there is no match found in the Registry Repository.

◆ Method: createUser
Description: Creates a new user in the system. This function has specific arguments. (See Appendix A on page 35 for a list of possible values for each field and Appendix B on page 37 for parameter specifications.)

◆ Method: createUser
Description: Creates a new user in the system. This function will allow you to flexibly insert a user into the system using column names. Before calling createUser, a call should be made to isUsrLoginTaken to check if the usr_login is available. (See Appendix A on page 35 for a list of possible values for each field and Appendix B on page 37 for parameter specifications.)

◆ Method: updateUser
Description: Updates a specific user. All fields are mandatory; to update a subset of the fields, provide all fields with updated information in only the fields that will change.

◆ Method: updateUser
Description: Updates a user's information in the system. Null values are not modified. To blank out fields, pass an empty string to the desired parameter. The update is based on the person_id.

◆ Method: changePassword
Description: Changes a user's password.

◆ Method: deleteUser
Description: Deletes a user from the users table.

◆ Method: getPersonID
Description: Gets the Person ID by supplying the usr_login.

◆ Method: isUserLoginTaken
Description: Checks if usr_login already exists in the system. This function returns false if there is no user with that usr_login. If it returns true, the usr_login is taken.

*100*

- Method: `getUserInfo`
  Description: Gets the information of a user from the system. This function returns `null` if an error occurs or there is no match found in the Registry Repository. See Appendix B on page 37 for the parameter specifications.

- Method: `addUserRole`
  Description: Adds a new Role to the specified `person_id`.

- Method: `updateUserRole`
  Description: Updates a user's Roles. Only the Role's start date and end date can be updated.

- Method: `deleteUserRole`
  Description: Deletes a specified Role from a user.

- Method: `getUserRoles`
  Description: Finds all the valid Roles for a specified user login name. This function returns a two-dimensional array with all the Roles that the user has. This function returns null if an error occurred or there is no match found in the Registry Repository.

Using the `user_plus` Interface

The `user_plus` table lets you store additional user information. You can use the following methods to create, modify, retrieve and delete rows in this table.

- Method: `insertUserPlus`
  Description: Inserts a new row into the `user_plus` table to hold extra user information.

- Method: `updateUserPlus`
  Description: Updates a specified row in the `user_plus` table that holds extra user information.

- Method: `getUserPlus`
  Description: Gets a row from the `user_plus` table that corresponds to a specified person identifier.

- Method: `deleteUserPlus`
  Description: Deletes an entry from the `user_plus` table that corresponds to a specified person identifier.

Appendix A

Time Zone and Locale Codes

| Time Zone code | Offset from GMT | Description | Note |
|---|---|---|---|
| GMT | 0 | Zero Time Zone | |
| ECT | 1 | Central European Time | |
| EET | 2 | Eastern European Time | |
| ART | 2 | "Baghdad, Kuwait, Nairobi" | |
| EAT | 3 | "Moscow, St. Petersburg" | |
| MET | 3 | "Tehran" | |
| NET | 4 | "Abu Dhabi, Tbilisi" | |
| PLT | 5 | "Islamabad, Karachi" | |
| IST | 5 | "Bombay, Calcutta, Colombo" | |
| BST | 6 | "Dhaka" | |
| VST | 7 | "Bangkok, Jakatta, Hanoi" | |
| CTT | 8 | "Hong Kong, Singapore, Taipai" | |
| JST | 9 | Japan Standard Time | |
| ACT | 9 | Australian Capital Territory | |
| AET | 10 | "Brisbane, Melbourne, Sydney" | |
| SST | 11 | "Salomon Is., New Caledonia" | |
| NST | 12 | "Wellington, Auckland" | |
| MIT | -11 | "Midway Is., Samoa" | |
| HST | -10 | Hawaii Standard Time | |
| AST | -9 | Alaska Standard Time | |

*102*

| Time Zone code | Offset from GMT | Description | Note |
|---|---|---|---|
| PST | -8 | Pacific Standard Time | |
| PNT | -7 | | Not included in the Registry |
| MST | -7 | Mountain Standard Time | |
| CST | -6 | Central Standard Time | |
| EST | -5 | East Standard Time | |
| IET | -5 | | Not included in the Registry |
| PRT | -4 | "Caracas, La Paz" | |
| CNT | -3 | "Newfoundland" | |
| AGT | -3 | "Buenos Aires, Brasilia" | |
| BET | -2 | Mid Atlantic Time | |
| CAT | -1 | "Azores, Cape Verde" | |

| Locale Code | Description |
|---|---|
| en_US | English |
| ja_JP | Japanese |

Note: The following values are case sensitive.

Possible Values for status
- ACTIVE
- INACTIVE
- PASSWORD EXPIRED

Possible Values for date_code
- en_US01
- en_US02
- ja_JP01

Appendix B

*Parameter Specifications for createUser and updateUser*

| Field Name | Field Type/Maximum Length | Required? | Null? |
|---|---|---|---|
| account_exp_date | DATE | No | |
| addr1 | VARCHAR 32 | No | |
| addr2 | VARCHAR 32 | No | |
| city | VARCHAR 32 | No | |
| company_name | VARCHAR 60 | No | |
| country | VARCHAR 32 | No | |
| created_date | DATE | | No |
| created_by | NUMBER | | No |
| currency_code | VARCHAR 10 | | |
| date_code | VARCHAR 12 | Yes | |
| descn | VARCHAR 255 | No | |
| dn | VARCHAR 255 | | |
| email | VARCHAR 64 | No | |
| last_success_login_date | DATE | | |
| last_unsuccess_login_date | DATE | | |
| last_success_login_from | VARCHAR 60 | | |
| last_unsuccess_login_from | VARCHAR 60 | | |
| locale_code | VARCHAR 10 | Yes | |
| lock_exp_date | DATE | | |
| modified_date | DATE | | No |
| modified_by | NUMBER 38 | | No |

*104*

| Field Name | Field Type/Maximum Length | Required? | Null? |
|---|---|---|---|
| number_of_wrong_logins | NUMBER | | |
| numeric_code | VARCHAR 10 | | |
| passwd | VARCHAR 200 | Yes | |
| pwd_algorithm | VARCHAR 1 | | |
| person_first_name | VARCHAR 20 | Yes | |
| person_id | NUMBER | Yes | |
| person_last_name | VARCHAR 20 | Yes | |
| person_middle_init | VARCHAR 1 | No | |
| phone | VARCHAR 16 | No | |
| pwd_exp_date | DATE | No | |
| pwd_exp_interval | NUMBER | No | |
| self_registration_id | VARCHAR 255 | | |
| state | VARCHAR 16 | No | |
| status | VARCHAR 16 | Yes | |
| time_zone_code | VARCHAR 3 | Yes | |
| usr_login | VARCHAR 32 | Yes | |
| zip | VARCHAR 16 | No | |

APPENDIX 2

CONFIGURABLE SETTINGS

/o 6.

File: app    .conf

Key: DisplayImageOnly

Description: When set to 1, the getAccess Resource Menu displays only the images associated with resource. When set to 0, both the image and the resource name are displayed.

File: directories.conf

Key: reslist

Description: The URL of the Resource Menu. If you create your own User Resource Menu, you would specify its URL here. For information about creating a custom user Resource Menu, see the *getAccess Resource Integration Guide.*

File: misc.conf

Key: useWelcome

Description: When set to 1, the Authentication Client displays the welcome page, including the user's previous successful and login and previous unsuccessful login attempt. When set to 0, the welcome page is not displayed.

File: redirection.conf

Key: check_ip

Description: Determines whether the getAccess Runtime module checks the IP address of the user when determining if he/she is correctly logged in.

Note: Changes to redirection.conf will not take complete effect until the config files are reloaded for this Web server. You can do this through the Servers option of the Administration Application.

File: registry.conf

Key: port

Description: Sets the port number for the Authentication Server module. Whenever this value is changed, you must change the port number in all Web servers running getAccess. In addition, change the port number in the Authentication Server module, then restart the Authentication serve ▲ Important: Protected Web servers will not be able to communicate with the Authentication server for remote and configuration purposes until the Authorization Server module is restarted.

Keys: min_threads & max_threads

Description: These keys contain the minimum and maximum number of threads allowed.
Each thread represents an open connection to the Registry Repository.

Key: loglevel

Description: The level of detail in the registry.log file. 0 means minimum detail, 3 is maximum.

Key: appendLogFile

Description: When set to 1, the Authentication Server appends log information to the existing reg istry.log file. When set to 0, the the registry log file is overwritten (and previous contents lost) ea time the Authentication Server module is started or restarted.

/07

Key: timeZone

Description: The time zone in which the Authentication Server is running.

---

Note: Changes in registry.conf do not take effect until the Authentication Server module is restarted.

---

File: serverConnection.conf

Key: maxfetchrecords

Description: Sets the maximum number of records the Authentication Server module retrieves from the Registry Repository.

Key: dbuser1

Description: The database user who owns the getAccess objects.

Key: dbpass1

Description: The encrypted password for dbuser1. You use the password encryption utility included with getAccess to create the value for this key.

The EncryptDBPassword is located in the <getAccess root>/bin directory. To access and use the utility follow these steps:

```
$ cd <getAccessRoot>/bin
$ ./java/bin/java -classpath .:./java/lib/classes.zip:./java/lib
  EncryptDBPassword <newPassword>
```

The EncryptDBPassword utility will encrypt *newPassword* with the default encryption and output it in standard output (normally the screen, or a file if you redirect the standard output). You can copy and paste the encrypted password in your <getAccess root>/config/serverConnection.conf file.

Key: twotask1

Description: The alias for the database that contains the getAccess objects.

---

Note: Changes in serverConnection.conf do not take effect until the Authentication Server module is restarted.

---

Additional Enhancements

It is possible to further enhance and personalize getAccess by customizing the Resource Menu presented to users, by customizing your Web applications for getAccess, and by enhancing custom Web resources using the getAccess Client Access Library API. For information about customizing getAccess in these ways, see the *getAccess Resource Integration Guide*.

What is claimed is:

1. A method of controlling access to one or more information resources stored on a first server, the method comprising the steps of:

receiving information describing a user at the first server;

identifying, at a second server coupled to the first server, a subset of the resources that the user is authorized to access, based on one or more roles that are stored in association with user identifying information;

communicating information defining the subset to the first server;

storing first information defining the sub set, and second information defining the rules, in one or more tokens;

communicating the one or more tokens to a client that is associated with the user; and thereafter resolving requests to use the resources at the first server by performing, for each request of said requests to use the resources at the first server, one or more steps that include examining one or more copies of said one or more tokens.

2. The method recited in claim 1, further comprising the steps of:

defining a role of the user; and storing an association of the user to the role at the second server.

3. The method recited in claim 1, further comprising the steps of:

defining one or more roles and functional groups of an organization to which the user belongs;

storing information describing the roles and functional groups in association with information describing the user; and determining whether the user may access the resource based on the information describing the roles and functional groups.

4. The method recited in claim 1, in which the identifying step further comprises the steps of:

connecting the first server to the second server, in which the second server stores information describing the user, one or more roles, one or more functional groups, the resources, and associations among them; and communicating a request for a profile of the user from the first server to the second server.

5. The method recited in claim 1, wherein the receiving step further comprises the step of:

receiving the information describing the user at a runtime module on the first server that also intercepts requests to access the resource.

6. The method recited in claim 1, in which the step of identifying further comprises the step of determining whether the user is authentic.

7. The method recited in claim 1, in which the step of identifying further comprises the step of communicating encrypted information between the first server and the second server describing resources that the user is authorized to use.

8. The method recited in claim 7, in which the step of communicating further comprises the step of passing one or more encrypted tokens that define the user's roles and authorization rights from the second server to the first server.

9. The method recited in claim 7, in which the step of communicating further comprises the steps of:

passing one or more encrypted tokens that define the user's roles and authorization rights from the second server to the client;

storing the tokens in a memory of the client.

10. The method recited in claim 1, further comprising the steps of:

communicating, from the first server to the client, a customized display identifying only those resources that the user may access, whereby a single secure sign-on gives a user access to one or more of the resources.

11. The method recited in claim 1, further comprising the step of:

communicating, from the first server to the client, information describing a customized display that identifies only those resources that the user may access.

12. A method of controlling access to one or more information resources stored on a protected server, the method comprising the steps of:

receiving, at the protected server, login information describing a user who desires to access one of the resources;

determining that the user is authentic and permitted to access one of the resources;

identifying, at a second server coupled to the protected server, a subset of the resources that the user is authorized to access, based on at least one role that is stored in association with user information;

communicating information defining the subset to the protected server;

storing first information defining the subset, and second information defining the roles, in one or more tokens;

communicating the one or more tokens to a client that is associated with the user; and thereafter resolving requests to use the resources at the protected server based on the one or more tokens by performing, for each request of said requests to use the resources at the protected server, one or more steps that include examining one or more copies of said one or more tokens, whereby a single secure sign-on gives the user access to the one of the resources.

13. The method recited in claim 12, further comprising the steps of:

receiving a request from the client to access one of the resources;

determining, based on the one or more tokens, whether the client is authorized to use the one of the resources; and granting access to the one of the resources to the client.

14. The method recited in claim 12, further comprising the step of intercepting the request from the client at a runtime module of the protected server.

15. The method recited in claim 1, further comprising the step of granting access to the resource only when the roles associated with the user satisfy an access rule.

16. The method recited in claim 15, further comprising the steps of defining the access rule, associated with the user, as a Boolean expression that includes one or more roles.

17. An apparatus for controlling access to an information resource, comprising:

a first server at which the information resource is stored and having an element that intercepts a request of a client to use the information resource;

a second server, coupled to the first server, having an element that generates a customized access menu in response to the request, and an element that determines whether the client is authentic and may access the resource; and a third server, coupled to the second server, having a data store that defines at least one role of the user and that defines whether the user may use the resource based on the role.

18. The apparatus recited in claim 17, further comprising
a plurality of information resources stored in the first
server;
one or more tokens that score first information defining a
subset of the plurality of information resources that the
user may access, and second information defining the at
least one role;
means for communicating the one or more tokens to a
client that is associated with the user; and
means for resolving requests to use the information
resources at the first server by performing, for each
request of said requests to use the information
resources, one or more steps that include examining
one or more copies of said one or more tokens.

19. A computer-readable medium carrying one or more
sequences of instructions for controlling access to information resources, wherein execution of the one or more
sequences of instructions by one or more processors causes
the one or more processors to perform the steps of:
receiving information describing a user at the first server;
identifying, at a second server coupled to the first server,
a subset of the resources that the user is authorized to
access, based on one or more roles that are stored in
association with user identifying information;
communicating information defining the subset to the first
server;
storing first information defining the subset, and second
information defining the roles, in one or more tokens;
communicating the tokens to a client that is associated
with the user; and
thereafter resolving requests to use the resources at the
first server based on the tokens.

20. The computer-readable medium recited in claim 19,
further comprising sequences of instructions for performing
the steps of granting access to the resource only when the
roles associated with the user satisfy an access rule.

21. The computer-readable medium recited in claim 20,
further comprising sequences of instructions for performing
the steps of defining the access rule, associated with the user,
as a Boolean expression that includes one or more roles.

22. The computer-readable media recited in claim 19,
further comprising sequences of instructions for performing
the steps of:
defining a role of the user; and
storing an association of the user to the role at the second
server.

23. The computer-readable media recited in claim 19,
further comprising sequences of instructions for performing
the steps of:
defining one or more roles and functional groups of an
organization to which the user belongs;
storing information describing the roles and functional
groups in association with information describing the
user; and
determining whether the user may access the resource
based on the information describing the roles and
functional groups.

24. The computer-readable media recited in claim 19, in
which the identifying step further comprises the steps of:
connecting the first server to the second server, in which
the second server stores information describing the
user, one or more roles, one or more functional groups,
the resources, and associations among them; and
communicating a request for a profile of the user from the
first server to the second server.

25. The computer-readable media recited in claim 19,
wherein the receiving step further comprises the step of:
receiving the information describing the user at a runtime
module on the first server that also intercepts request to
access the resource.

26. The computer-readable media recited in claim 19, in
which the step of identifying further comprises the step of
determining whether the user is authentic.

27. The computer-readable media recited in claim 19, in
which the step of identifying further comprises the step
communicating encrypted information between the first
server and the second server describing resources that the
user is authorized to use.

28. The computer-readable media recited in claim 27, in
which the step of communicating further comprises the step
of passing one or more encrypted tokens that define the
user's roles and authorization rights from the second server
to the first server.

29. The computer-readable media recited in claim 27, in
which the step of communicating further comprises the steps
of:
passing one or more encrypted tokens that define the
user's roles and authorization rights from the second
server to the client;
storing the tokens in a memory of the client.

30. The computer-readable media recited in claim 19,
further comprising sequences of instructions for performing
the steps:
communicating, from the first server to the client, a
customized display identifying only those resources
that the user may access,
whereby a single secure sign-on gives a user access to one
or more of the resources.

31. The computer-readable media recited in claim 19,
further comprising sequences of instructions for performing
the step of:
communicating, from the first server to the client, information describing a customized display that identifies
only those resources that the user may access.

32. A computer-readable carrying one or more sequences
of instructions for controlling access to one or more information resources stored on a protected server, wherein
execution of the one or more sequences of instructions by
one or more processors causes the one or more processors to
perform the steps of:
receiving, at the protected server, login information
describing a user who desires to access one of the
resources;
determining that the user is authentic and permitted to
access one of the resources;
identifying, at a second server coupled to the protected
server, a subset of the resources that the user is authorized to access, based on at least one role that is stored
in association with user information;
communicating information defining the subset to the
protected server;
storing first information defining the subset and second
information defining the roles, in one or more tokens;
communicating the one or more tokens to a client that is
associated with the user; and
thereafter resolving requests to use the resources at the
protected server based on the one or more tokens by
performing, for each request of said requests to use the information resources, one or more steps that include examining one or more copies of said one or more tokens, whereby a single secure sign-on gives the user access to the one of the resources.

33. The computer-readable media recited in claim 32, further comprising sequences of instructions for performing the steps of:

receiving a request from the client to access one of the resources;

determining, based on the one tokens, whether the client is authorized to use the one of the resources; and granting access to the one of the resources to the client.

34. The computer-readable media recited in claim 32, further comprising sequences of instructions for performing the step of intercepting the request from the client at a runtime module of the protected server.

* * * * *

UNITED STATES PATENT AND TRADEMARK OFFICE
CERTIFICATE OF CORRECTION

PATENT NO. : 6,182,142 B1
DATED : January 30, 2001
INVENTOR(S) : Teresa Win, et al.

Page 1 of 1

It is certified that error appears in the above-identified patent and that said Letters Patent is hereby corrected as shown below:

<u>Column 121,</u>
Line 30, after "communicating the", insert -- one or more --;
Line 33, replace "based on the tokens." with -- by performing, for each request of said request to use the resources at the first server, one or more steps that include examining one or more copies of said one or more tokens. --

Signed and Sealed this

Twenty-third Day of October, 2001

Attest:

NICHOLAS P. GODICI
Attesting Officer  Acting Director of the United States Patent and Trademark Office